(12) United States Patent
Nomura et al.

(10) Patent No.: US 6,819,394 B1
(45) Date of Patent: Nov. 16, 2004

(54) TIME-VARYING IMAGE EDITING METHOD AND TIME-VARYING IMAGE EDITING DEVICE

(75) Inventors: Toshio Nomura, Ichihara (JP); Keiichi Hibi, Matsudo (JP); Masahiro Shioi, Chiba (JP); Shuichi Watanabe, Chiba (JP)

(73) Assignee: Sharp Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/786,737

(22) PCT Filed: Sep. 1, 1999

(86) PCT No.: PCT/JP99/04733

§ 371 (c)(1), (2), (4) Date: Jun. 6, 2001

(87) PCT Pub. No.: WO00/18117

PCT Pub. Date: Mar. 30, 2000

(30) Foreign Application Priority Data

Sep. 8, 1998 (JP) .......................... 10-253386
Dec. 2, 1998 (JP) .......................... 10-342913

(51) Int. Cl.[7] .......................... G03B 31/02; G09G 5/00
(52) U.S. Cl. .......................... 352/38; 345/723
(58) Field of Search .......................... 345/723; 386/52; 375/240.26; 352/38

(56) References Cited

U.S. PATENT DOCUMENTS

| 5,177,513 A | | 1/1993 | Saito .......................... 352/129 |
| 5,339,393 A | | 8/1994 | Duffy et al. .................. 395/161 |
| 5,519,828 A | * | 5/1996 | Rayner ....................... 345/723 |
| 5,537,528 A | | 7/1996 | Takahashi et al. ............ 395/154 |
| 5,640,601 A | * | 6/1997 | Peters ........................ 345/501 |
| 5,786,814 A | * | 7/1998 | Moran et al. ................ 345/720 |
| 6,239,801 B1 | * | 5/2001 | Chiu et al. .................. 345/723 |
| 6,360,234 B2 | * | 3/2002 | Jain et al. .................. 707/500.1 |

FOREIGN PATENT DOCUMENTS

| EP | 0 774 756 A2 | 5/1997 |
| EP | 0 860 829 A2 | 8/1998 |
| JP | 8-339377 | 12/1996 |
| JP | 9-266562 | 10/1997 |
| JP | 10-13773 | 1/1998 |
| JP | 10-117322 | 5/1998 |
| JP | 10-200854 | 7/1998 |
| JP | 10-290419 | 10/1998 |

* cited by examiner

*Primary Examiner*—David Gray
*Assistant Examiner*—Arthur A Smith
(74) *Attorney, Agent, or Firm*—David G. Conlin, Esq.; John J. Penny, Jr.; Edwards & Angell, LLP

(57) ABSTRACT

A time-varying image editing device is provided on a recording medium (101) and used for editing time-varying image data reproduced from a time-varying image file containing time-varying image data body (111) the items of which are arranged together with time management information in temporal order and outputted. The device includes a file-to-be-reproduced extracting section (12) for extracting a desired reproduction part of a time-varying image file. The desired part contains a predetermined reproduction time. The device further includes a file creating section (17) for storing edit information (112) for managing the extracted reproduction part and the reproduction time in an area other than the one where the time-varying image data body is stored on the recording medium (101).

15 Claims, 22 Drawing Sheets

FIG.1
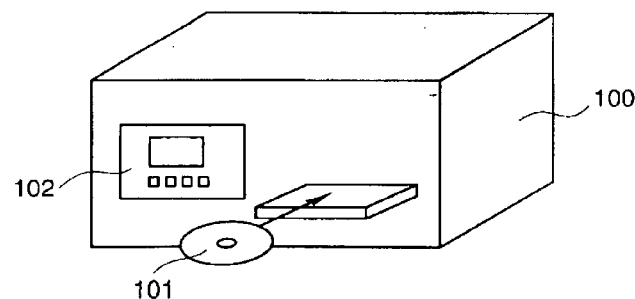
FIG.2
| EDIT INFORMATION |
|---|
| EDIT ELEMENT NUMBER |
| Loop (EDIT ELEMENT NUMBER) { |
|     PLAYBACK OBJECT FILE ID |
|     PLAYBACK START POSITION |
|     PLAYBACK END POSITION |
|     PLAYBACK TIME MANAGEMENT INFORMATION |
| } |
FIG.3
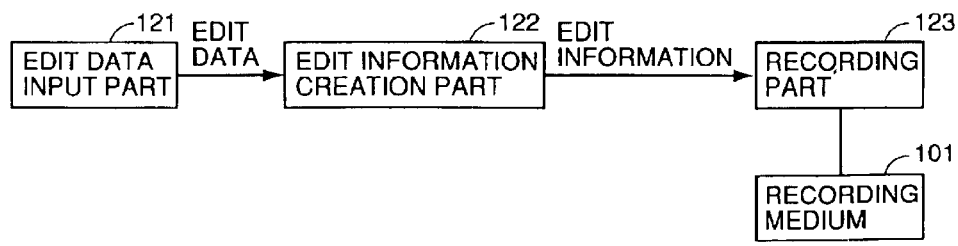

FIG.9

| EDIT INFORMATION |
|---|
| EDIT ELEMENT NUMBER: 2<br>PLAYBACK OBJECT FILE ID: FILE X<br>PLAYBACK START POSITION: TIME STAMP 1<br>PLAYBACK END POSITION: TIME STAMP 2<br>PLAYBACK TIME MANAGEMENT INFORMATION: OFFSET 1<br>PLAYBACK OBJECT FILE ID: FILE X<br>PLAYBACK START POSITION: TIME STAMP 6<br>PLAYBACK END POSITION: TIME STAMP 8<br>PLAYBACK TIME MANAGEMENT INFORMATION: OFFSET 4 |

FIG.10

| EDIT INFORMATION |
|---|
| EDIT ELEMENT NUMBER: 2<br>PLAYBACK OBJECT FILE ID: FILE X<br>PLAYBACK START POSITION: TIME STAMP 1<br>DURATION: 2<br>PLAYBACK TIME MANAGEMENT INFORMATION: TIMER TIME 0<br>PLAYBACK OBJECT FILE ID: FILE X<br>PLAYBACK START POSITION: TIME STAMP 6<br>DURATION: 3<br>PLAYBACK TIME MANAGEMENT INFORMATION: TIMER TIME 2 |

| EDIT INFORMATION α |
|---|
| EDIT ELEMENT NUMBER: 2 |
| PLAYBACK OBJECT FILE ID: A |
| PLAYBACK START POSITION: POSITION OF 0 |
| PLAYBACK END POSITION: POSITION OF ta |
| PLAYBACK TIME MANAGEMENT INFORMATION: 0 |
| PLAYBACK OBJECT FILE ID: B |
| PLAYBACK START POSITION: POSITION OF 0 |
| PLAYBACK END POSITION: POSITION OF tb |
| PLAYBACK TIME MANAGEMENT INFORMATION: -ta |

FIG.15A

```
EDIT INFORMATION α
  EDIT ELEMENT NUMBER: 2
  PLAYBACK OBJECT FILE ID: A
  PLAYBACK TIME MANAGEMENT INFORMATION: 0
  PLAYBACK OBJECT FILE ID: B
  PLAYBACK TIME MANAGEMENT INFORMATION: -ta
```

FIG.15B

```
EDIT INFORMATION α
  PLAYBACK OBJECT FILE ID: A
  PLAYBACK OBJECT FILE ID: B
  PLAYBACK TIME MANAGEMENT INFORMATION: -ta
```

| EDIT INFORMATION α 3 |
|---|
| EDIT ELEMENT NUMBER: 2<br>PLAYBACK OBJECT FILE ID: C<br>PLAYBACK START POSITION: POSITION OF 0<br>PLAYBACK END POSITION: POSITION OF ta<br>PLAYBACK TIME MANAGEMENT INFORMATION: 0<br>PLAYBACK OBJECT FILE ID: C<br>PLAYBACK START POSITION: POSITION OF tc1<br>PLAYBACK END POSITION: POSITION OF tc2<br>PLAYBACK TIME MANAGEMENT INFORMATION: -ta |

*FIG.17*

```
EDIT INFORMATION α3
  EDIT ELEMENT NUMBER: 2
  PLAYBACK START POSITION: POSITION OF 0
  PLAYBACK END POSITION: POSITION OF ta
  PLAYBACK TIME MANAGEMENT INFORMATION: 0
  PLAYBACK START POSITION: POSITION OF tc1
  PLAYBACK END POSITION: POSITION OF tc2
  PLAYBACK TIME MANAGEMENT INFORMATION: -ta
```

FIG.18A

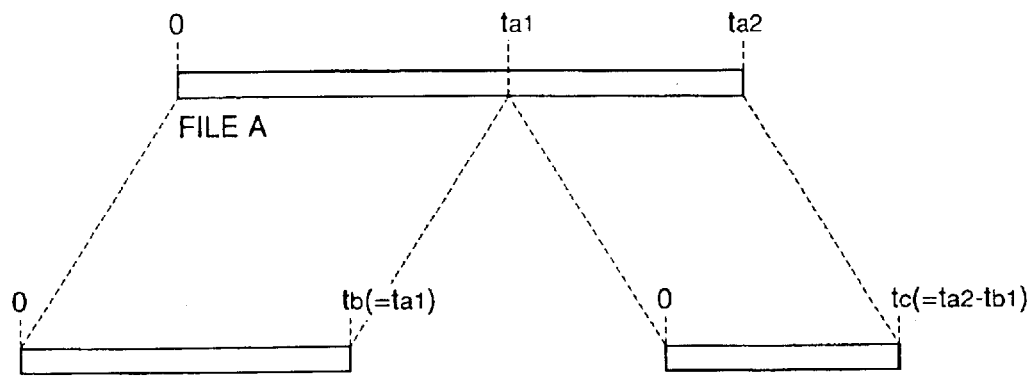

FIG.18B

| EDIT INFORMATION α |
|---|
| EDIT ELEMENT NUMBER: 1 |
| PLAYBACK OBJECT FILE ID: A |
| PLAYBACK START POSITION: POSITION OF 0 |
| PLAYBACK END POSITION: POSITION OF ta1 |
| PLAYBACK TIME MANAGEMENT INFORMATION: 0 |

FIG.18C

| EDIT INFORMATION β |
|---|
| EDIT ELEMENT NUMBER: 1 |
| PLAYBACK OBJECT FILE ID: A |
| PLAYBACK START POSITION: POSITION OF ta1 |
| PLAYBACK END POSITION: POSITION OF ta2 |
| PLAYBACK TIME MANAGEMENT INFORMATION: ta1 |

*FIG.20*

```
EDIT INFORMATION α2
    PLAYBACK TIME MANAGEMENT INFORMATION: ta1
```

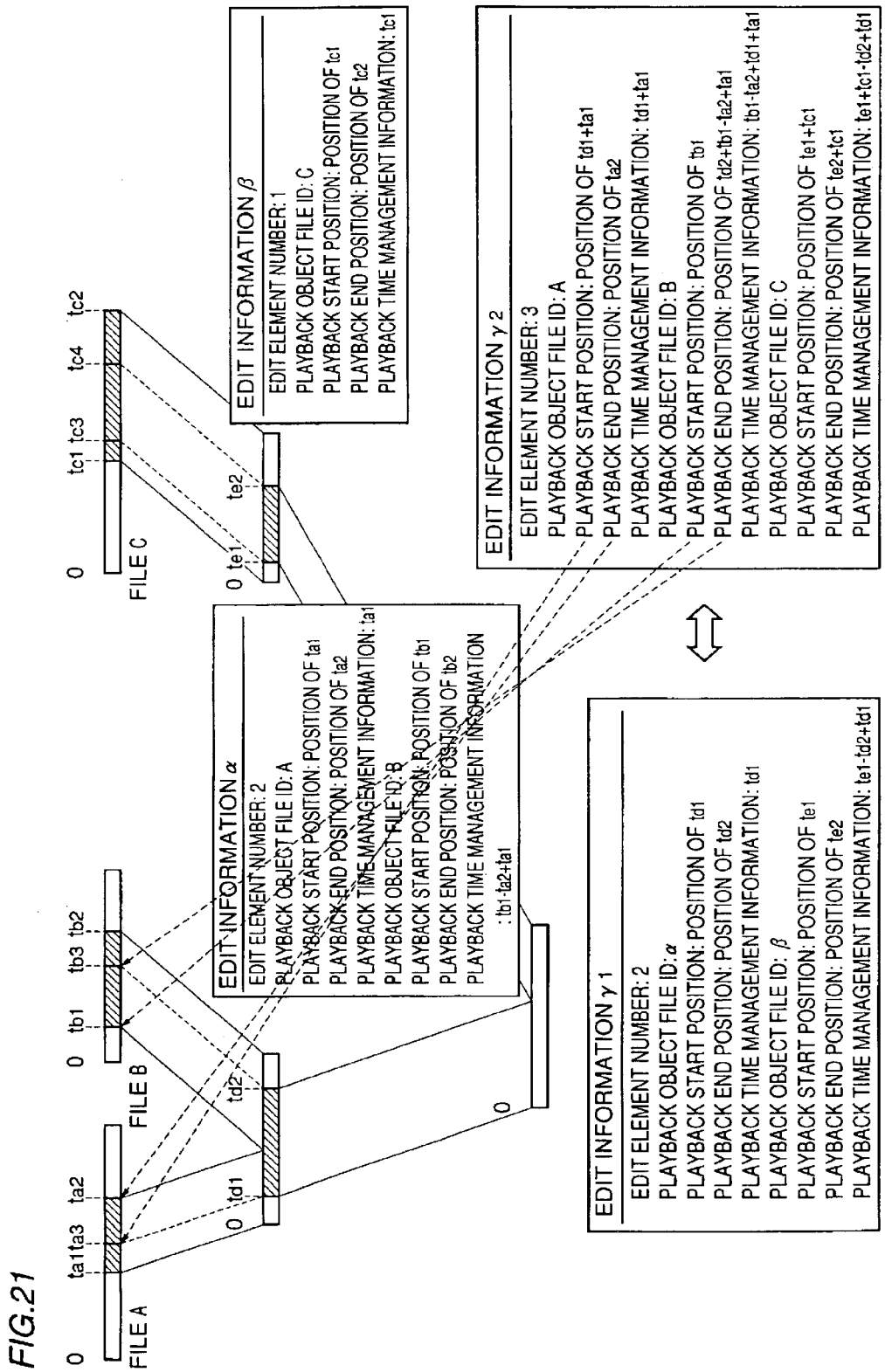

*FIG.22A*

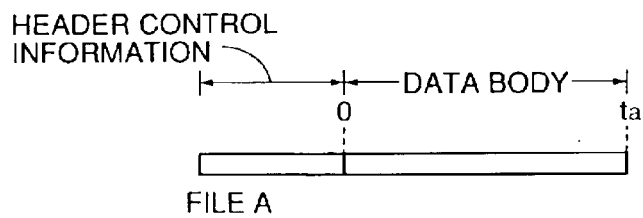

FILE A

*FIG.22B*

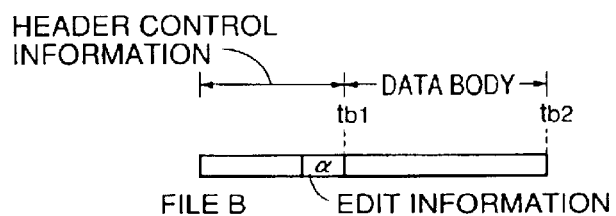

FILE B  EDIT INFORMATION

*FIG.22C*

EDIT INFORMATION α
  PLAYBACK TIME MANAGEMENT INFORMATION: tb1

*FIG.22D*

EDIT INFORMATION β
  EDIT ELEMENT NUMBER: 2
  PLAYBACK OBJECT FILE ID: A
  PLAYBACK START POSITION: POSITION OF 0
  PLAYBACK END POSITION: POSITION OF ta
  PLAYBACK TIME MANAGEMENT INFORMATION: 0
  PLAYBACK OBJECT FILE ID: B
  PLAYBACK START POSITION: POSITION OF tb1
  PLAYBACK END POSITION: POSITION OF tb2
  PLAYBACK TIME MANAGEMENT INFORMATION: tb1-ta

*FIG.22E*

EDIT INFORMATION β
  PLAYBACK OBJECT FILE ID: A
  PLAYBACK OBJECT FILE ID: B
  PLAYBACK TIME MANAGEMENT INFORMATION: -ta

*FIG.22F*

EDIT INFORMATION β
  PLAYBACK OBJECT FILE ID: A
  PLAYBACK OBJECT FILE ID: B

*FIG.22G*

EDIT INFORMATION α
  PLAYBACK TIME MANAGEMENT INFORMATION: tb1-ta

TIME-VARYING IMAGE EDITING METHOD AND TIME-VARYING IMAGE EDITING DEVICE

TECHNICAL FIELD

The present invention relates to a motion picture editing method and a motion picture editing apparatus editing motion picture data played and output from at least one motion picture file stored on a recording medium and having a motion picture data body arranged in temporal order along with time management information.

BACKGROUND ART

Multimedia information employed for the so-called streaming playback playing data while receiving the same is described with reference to FIG. 23. Each multimedia information, independently stored as a single completed file per certain unit, is formed by header control information indicating the attribute, the property etc. of the overall multimedia information included in this file and a multimedia data body.

The header control information includes control information related to the overall multimedia information stored in the file, such as a file identifier (file ID) for specifying the file, the length of the multimedia data body, a time required for playing the overall file, the average/maximum bit rate, the types and the number of media included in the multimedia data body, the dependence relation between the media (an upper layer and a lower layer of hierarchized information, a right channel, a left channel, a center and a surround of an audio etc.), the association between the media (Japanese/English/French/voice guidance and subtitles of images and voices, Japanese/English of close captions etc.) and the like.

The header control information also includes information related to systematic control, related to only partial media included in the multimedia information but necessary for playing the file, such as the frame size/resolution of images, a coding method (identification of ITU-Recommendation H.261, H.262, H.263, H26L, ISO standard 11172 (MPEG-1), 13818-2 (MPEG-2), 14496-2 (MPEG-4) or the like, for example), parameters (the profile, the level, selection of an option mode etc.) in the coding system and the like.

Further, the header control information also includes information for storing the position of the multimedia information, such as index information specifying random-accessible positions, proper positions of temporally continuous multimedia information, stored marker information and the like.

The index information is utilized for deciding an access position halfway through the multimedia information, deciding playback object information for playing information in a skipping manner at a high speed or the like. Specifically, an intra-frame/field coded frame (intra-coded frame/field) or the like is specified as the index information when coded motion picture data is referred to.

This is because the intra-frame/field coded frame is a proper access point since the same is independently coded with no supplementation from precedent and subsequent information (frames) or the like and can be individually decoded and played while subsequent motion picture information can be sequentially decoded and played on the basis thereof.

When intra-frame coded frames are periodically inserted as in the GOP (Group of Pictures) structure in the coding system such as MPEG-1 or MPEG-2, for example, the periodic intra-frame coded frames (heads of GOPs) can be specified with the index information respectively. Further, the quantity of information of the index information can be reduced by providing only indices specifying skipped intra-frame coded frames as one for two GOPs or one for three GOPs.

Thus, when the index information specifies only periodic intra-frame coded frames, high-speed playback can be readily implemented at a constant rate by merely tracing the index information in high-speed playback.

When scene change or large motion/change is coded by automatically inserting detected output or an intra-frame coded frame, the index information may also specify the automatically inserted intra-frame coded frame, in addition to the aforementioned periodic intra-frame coded frames. In this case, random-accessible positions can be set in more detail although periodicity of positions specified by the index information is not guaranteed.

The data body of the multimedia information is arranged and stored in order of playback times in such a state that various types of media such as motion pictures, voices/audios etc. are intermixed. The order of storage is decided only with reference to the times, regardless of the types of the media.

While the data may be stored along the order in filming/recording for implementing storage in the order of playback times, the order of storage is decided in consideration of processing (decoding) delays between reading and outputting information, which vary with the media. When simultaneously filmed/recorded motion picture and voice are to be simultaneously played, the motion picture having a larger decoding delay is stored in advance by this delay time.

The data body is stored in temporal order as described above, and hence the data may simply be sequentially read from the head of the file, decoded and thereafter output when the same is played. When a server keeps a file storing multimedia information and transmits the data of the file through the Internet in response to access from a user, for example, the burden on the server can be extremely effectively lightened due to the aforementioned characteristic since the server may simply sequentially read and send the data body.

As described later, a time stamp indicating a read/playback time is appended to each packet of the data body, in order to control the timing of reading and playback. The server is required to send the data body at the time according to the time stamp value of the read data body packet.

This access mode of the multimedia information is referred to as streaming transfer (streaming service).

As to the data body of the multimedia information, input information may be stored as such, or the information may be compressed and coded by the aforementioned coding system. Further, the data body is divided into packets of a proper size, and stored as paketed information. Therefore, the data body of the multimedia information in the file is formed by a packet train of the information of each medium.

The packets of this data body are created and stored for the information of the respective media, and a single packet basically includes only data of a single medium. The lengths of the packets may be fixed or variable. Further, the lengths (the maximum lengths or average lengths in the case of the variable lengths) of the packets may completely vary with the media, or may be substantially similar to each other regardless of the types of the media.

When the packets have fixed lengths, the lengths are decided in response to systematic conditions such as sector lengths, record lengths, track lengths etc. of recording media, for example. When the quantity of information (bit rate) per hour with respect to the data of the media is constant, the quantity of information coincides with time intervals and hence the packet lengths can be set in response to temporal conditions.

When the packets have variable lengths, the unit of packeting can be decided in response to the properties of the data (coded information) of the media. The; simplest unit is matched with the unit of coding/decoding/playback output processing such as one coded unit frame for voices, one frame/field for motion pictures or the like.

In the aforementioned example, however, the quantity of information is disadvantageously too small for voices or too large for motion pictures. Therefore, the data body is packeted by combining a plurality of coded unit frames with each other for voices or further dividing coded information of one frame/field for motion pictures.

The unit for dividing coded information of motion pictures may be matched with a delimiter in the coded data structure such as a GOB (Group Of Blocks) in the coding system of ITU-Recommendation H.261, a GOB or an adaptive slice of Recommendation H.263, a slice of Recommendation H.262|ISO Standard 13818-2 (MPEG-2), a slice (video packet) of Standard 14496-2 (MPEG-4) or the like.

Further, a packet header indicating the attribute of the packet is affixed to each packet. The packet header includes the packet length, a flag indicating whether or not the position is random-accessible, the time stamp for time management etc. The time stamp indicates the time to send the packet to a client, i.e., the time to start processing on the packet.

In the format of a multimedia information file X shown in FIG. 23, the header control information is arranged and stored at the head, followed by the multimedia data body. When the file is read from the head in playback, the header information is obtained first so that the whole situation of the data body can be grasped, a system necessary for playback can be set and initialized, and an operation mode can be set.

If the data body is stored at the head followed by the header control information to the contrary, the data body can be immediately accessed and read when system control and mode setting are unnecessary (no control parameter is necessary, the mode is previously known, etc.) in a simple playback system, for example.

Further, part of the header control information may be stored at the head, followed by the data body and the remaining part of the header control information. When index information, marker information and the like are not utilized, these data may be arranged at the back of the data body so that unnecessary information can be completely ignored in playback.

A playback apparatus for the aforementioned multimedia information is now described with reference to FIG. 24 and FIG. 25. FIG. 24 is a functional block diagram showing a conventional playback apparatus for multimedia information, and FIG. 25 is a flow chart showing playback operation in the conventional playback apparatus for multimedia information.

Referring to FIG. 24, the conventional playback apparatus includes a time stamp read part 1 reading a time stamp included in each packet header from a desired multimedia information file, a playback timer 2 starting counting a timer time on the basis of a playback instruction received from a user, a compare part 3 comparing the time stamp read in the time stamp read part 1 with the timer time (playback reference time) counted by the playback timer 2, and a playback control part 4 outputting the multimedia information file when the timer time is identical to or leads the time stamp as a result of comparison in the compare part 3.

The operation of this playback apparatus is now described with reference to the flow chart of FIG. 25. When the user instructs the playback apparatus to play the multimedia information file, the playback timer 2 starts counting the timer time. Further, the playback timer 2 reads the time stamp included in each packet header from the target multimedia information file (step 21), and acquires the current timer time (step 22).

Then, the compare part 3 compares the time stamp read at the step 21 with the timer time acquired at the step 22 (step 23), and when the timer time is identical to or larger than the time stamp, the playback control part 4 starts playing and outputting the multimedia information data (step 24). When the timer time is smaller than the time stamp, the process returns to the step 22 and repeats the aforementioned operation.

The playback apparatus is authorized to play and output the packet part to which the time stamp is appended only when the time stamp read in the time stamp read part 1 is identical to or smaller than the timer time counted in the playback timer 2, whereby the data can be output from the head of the file along the order of storage in response to the timer time.

However, the aforementioned conventional playback apparatus for multimedia information plays and outputs the multimedia data body on the basis of the result of comparison of the time stamp appended in order of playback times in the file and the timer time, and hence, when the multimedia data body is edited by temporal cut and paste such as extraction, division and connection, a new edited multimedia data body must be created and stored independently of the unedited multimedia data body. Therefore, extremely large areas are disadvantageously required as a working area for editing and a storage area for the result of editing.

In order to readily edit and change motion picture data without creating new motion picture data from a motion picture file, the following method is conceivable:

When only a part A and a part B are to be extracted, played and output from the multimedia information file X shown in FIG. 23, an instruction for playing the part B (a start time stamp 6 and an end time stamp 8) subsequently to the part A (a start time stamp 1 and an end time stamp 2) is supplied. When the motion picture data is played while reading the time stamps on the basis of this instruction, however, it follows that the part A is started to be played and displayed when the playback time of the playback timer reaches 1, no part is displayed while the timer time is 3 to 6 and the part B is started to be played and displayed when the timer time reaches 6 as shown in FIG. 26, and the part A and the part B cannot be continuously played immediately after the playback instruction.

The playback time for arbitrarily extracted partial data is decided by w the timer time (playback reference time) of the playback timer and cannot a be changed with respect to the timer time, and hence the data cannot be edited by temporal cut and paste employing extraction, division, connection and the like.

The present invention has been proposed in consideration of the aforementioned problems, and an object of the present invention is to provide a motion picture editing method and a motion picture editing apparatus capable of readily editing a multimedia data body arranged in temporal order along with time stamps by temporal cut and paste employing extraction, division, connection and the like.

DISCLOSURE OF THE INVENTION

The motion picture editing method according to the present invention edits motion picture data played and output from a motion picture file stored on a recording medium and having a motion picture data body formed by arranging time management information and motion picture data corresponding to the said time management information in temporal order.

The motion picture editing method previously specifies at least one playback range in the motion picture file and a playback time of the playback range, appends information for managing the specified playback range and the playback time of the playback range to an area other than the motion picture data body on the recording medium as edit information, and outputs motion picture data of the specified range in the motion picture file at the specified time on the basis of the time management information and the edit information.

For example, time management information (time stamp) included in the motion picture data body, a physical storage position in the motion picture file, a packet number, the serial number of index information, a frame/field number, an arbitrary playback time or the like can be employed for specifying the playback range.

Preferably, the motion picture editing method changes the time management information in the output motion picture data on the basis of the edit information, and creates a new motion picture file.

More preferably, the motion picture editing method appends edit information including information for managing the playback time for the output motion picture data to an area other than the motion picture data body on the recording medium, and creates a new motion picture file.

According to another aspect of the present invention, the motion picture editing method edits motion picture data played and output from a motion picture file stored on a recording medium and having a motion picture data body formed by arranging time management information and motion picture data corresponding to the said time management information in temporal order. The motion picture editing method previously specifies at least one playback range in the motion picture file and a playback time of the playback range, appends information for managing the specified playback range and the playback time of the playback range to an area other than the motion picture data body on the recording medium as first edit information, defines an edit result in the motion picture file on the basis of the time management information and the first edit information, further specifies at least one playback range in the edit result and a playback time of the playback range, appends information for managing the specified playback range and the playback time of the playback range to an area other than the motion picture data body on the recording medium as second edit information, and outputs motion picture data of the specified range in the motion picture file at the specified time on the basis of time management information in the edit result and the second edit information.

According to still another aspect of the present invention, the motion picture editing apparatus edits motion picture data played and output from a motion picture file stored on a recording medium and having a motion picture data body formed by arranging time management information and motion picture data corresponding to the time management information in temporal order. The motion picture editing apparatus includes means specifying a desired playback range and a playback time of the playback range, means extracting specific information of the specified playback range and playback time information, means creating edit information on the basis of the extracted specific information and playback time information and recording the edit information in an area other than the motion picture data body on the recording medium, and playback means playing the playback range at the specified time on the basis of the edit information.

According to a further aspect of the present invention, a motion picture playback apparatus plays a motion picture file stored on a recording medium and having a motion picture data body formed by arranging time management information and motion picture data corresponding to the time management information in temporal order. The motion picture playback apparatus includes edit information read means reading edit information appended to an area other than the motion picture data body on the recording medium and including information for managing a playback time of the motion picture data, time management information read means reading time management information in the motion picture data, playback time adjustment means carrying out a prescribed operation on the time management information read in the time management information read means and calculating a specified playback time on the basis of the information for managing the playback time read in the edit information read means, compare means comparing the specified playback time calculated in the playback time adjustment means with a time counted by a playback timer, and control means outputting motion picture data in the motion picture file at the specified time on the basis of a result of comparison in the compare means.

According to a further aspect of the present invention, the motion picture editing method appends edit information including information for managing a playback time of motion picture data to a motion picture data body stored on a recording medium and formed by arranging time management information and motion picture data corresponding to the time management information in temporal order, and creates a new motion picture file. The motion picture editing method appends the edit information to an area other than the motion picture data body on the recording medium.

BRIEF DESCRIPTION OF THE DRAWINGS

FIG. 1 is a schematic diagram showing the appearance of a motion picture editing apparatus to which the present invention is applied.

FIG. 2 is a diagram showing the structure of an edit information file in a motion picture editing method and a motion picture editing apparatus according to one embodiment of the present invention.

FIG. 3 is a block diagram showing a part of the motion picture editing apparatus recording edit information.

FIG. 9 is a diagram showing exemplary edit information in the motion picture editing method and the motion picture editing apparatus according to one embodiment of the present invention.

FIG. 10 is a diagram showing another exemplary edit information in the motion picture editing method and the motion picture editing apparatus according to one embodiment of the present invention.

FIG. 15A and FIG. 15B are diagrams showing other exemplary edit information in the second embodiment.

FIG. 17 is a diagram showing another exemplary edit information included in the new multimedia information file created from playback output in the second embodiment.

FIG. 18A, FIG. 18B and FIG. 18C are diagrams showing playback output and exemplary edit information therefor in a motion picture editing method and a motion picture editing apparatus according to a third embodiment of the present invention.

FIG. 20 is a diagram showing exemplary edit information included in the new multimedia information files created from playback output in the third embodiment.

FIG. 21 is a diagram showing playback output and exemplary edit information therefor in a motion picture editing method and a motion picture editing apparatus according to a fourth embodiment of the present invention.

FIG. 22A to FIG. 22G are diagrams showing exemplary edit information in a motion picture editing method and a motion picture editing apparatus according to a fifth embodiment of the present invention.

BEST MODES FOR CARRYING OUT THE INVENTION

Figure 4A:
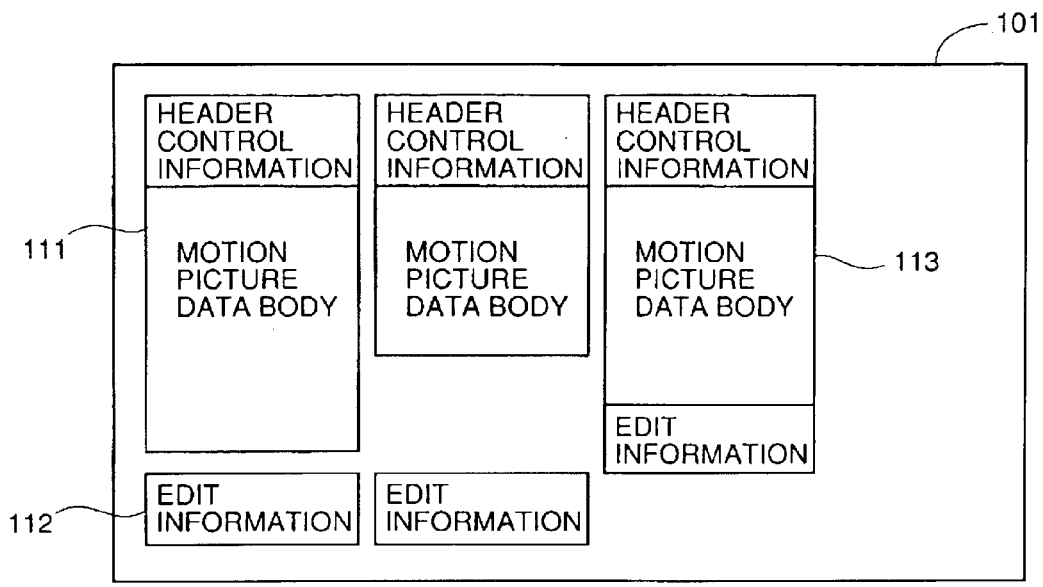
FIG. 4A and FIG. 4B are schematic diagrams showing the contents of information recorded on a recording medium.

One embodiment of the present invention is now described with reference to drawings as to operation of extracting, continuously playing and outputting an arbitrary part from a multimedia information file. The same reference numerals are assigned to parts identical to those in the aforementioned conventional example, and redundant description is not repeated.

Referring to FIG. 1, a motion picture editing apparatus 100 to which the present invention is applied includes a part in which a recording medium 101 recording multimedia information is inserted for playing the recording medium 101 and an edit data input part 102 receiving edit data for playing desired data recorded on the recording medium 101.

Referring to FIG. 1 to FIG. 12D, edit information (partial playback specify information) for specifying only a specific part in a data body of temporally continuously stored multimedia information is appended onto the recording medium in this embodiment. This edit information includes a playback object file ID, a playback start position, a playback end position, playback time management information etc., as shown in FIG. 2.

Referring to FIG. 3, a part of the motion picture editing apparatus 100 recording the edit information includes an edit data input part 121, an edit information creation part 122 creating edit information with received edit data and a recording part 123 recording the created edit information on the recording medium 101. The edit data input part 121, identical to the edit data input part 102 shown in FIG. 1, outputs information (edit data) necessary for editing. The edit information creation part 122 creates the edit information shown in FIG. 2 from the edit data. The recording medium 101 records multimedia information and file information thereon.

FIG. 4A is a schematic diagram showing control information and edit information recorded on the recording medium 101. Referring to FIG. 4A, edit information corresponding to a multimedia information file 111 is recorded as an independent edit information file 112 different from the multimedia information file 111. In a multimedia information file 113, edit information is recorded in the same file. FIG. 4A is a conceptual diagram to the utmost, not expressing a physical recorded situation.

Figure 4B:
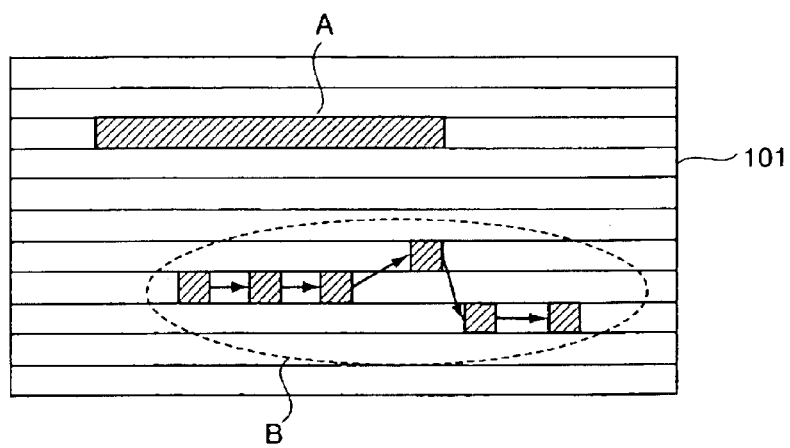

FIG. 4B is a schematic diagram showing the recorded situation of the control information and the edit information. Referring to FIG. 4B, files may be recorded on continuous addresses as a group (A), or may be recorded bit by bit on skipped positions (B). The files may not necessarily be recorded as shown at A, but can be handled as a single file similarly to those shown at A also when recorded as shown at B, by recording the respective addresses and the order for linking the addresses in a different position (a file allocation table, for example).

In the edit information shown in FIG. 2, N (N: arbitrary integer) parts can be specified from a first playback start position, a first playback end position, a second playback start position, . . . , an N-th playback start position, up to an N-th playback end position, so that a plurality of parts can be extracted. This is implemented by attaining a description structure of information capable of enumerating sets of playback start points and playback end points by a desired number (N). The number N corresponds to an edit element number shown in FIG. 2.

Thus, when a plurality of playback start points and playback end points are specified, it means that N parts are to be concatenated into one and played when multimedia information data is played on the basis of this edit information.

Playback start positions and playback end positions may be specified by a method of directly specifying the data body or a method of specifying index information and indirectly specifying the data body from the index information.

When the data body is directly specified, either a physical storage position (an offset value from the file head or an offset value from the head of the data body, for example) of the specified data body packet in the file or a packet number (a serial number from the head) assigned to the data body packet may be specified.

When the physical storage position in the file is specified, the target data packet can advantageously be read by seeking through the file in reading regardless of the structure in the file or the structure and format of the data body packet. When the number of the packet is specified, the apparatus can be prevented from specifying an erroneous position such as an intermediate position of the packet due to excellent consistency with management and processing of another data body formed by packets.

When the data body is indirectly specified from the index information, either a physical storage position (an offset value from the file head or an offset value from the head of the index information, for example) of the specified index information in the file or an index information number (a serial number from the head) assigned to the index information may be specified.

Figure 5:
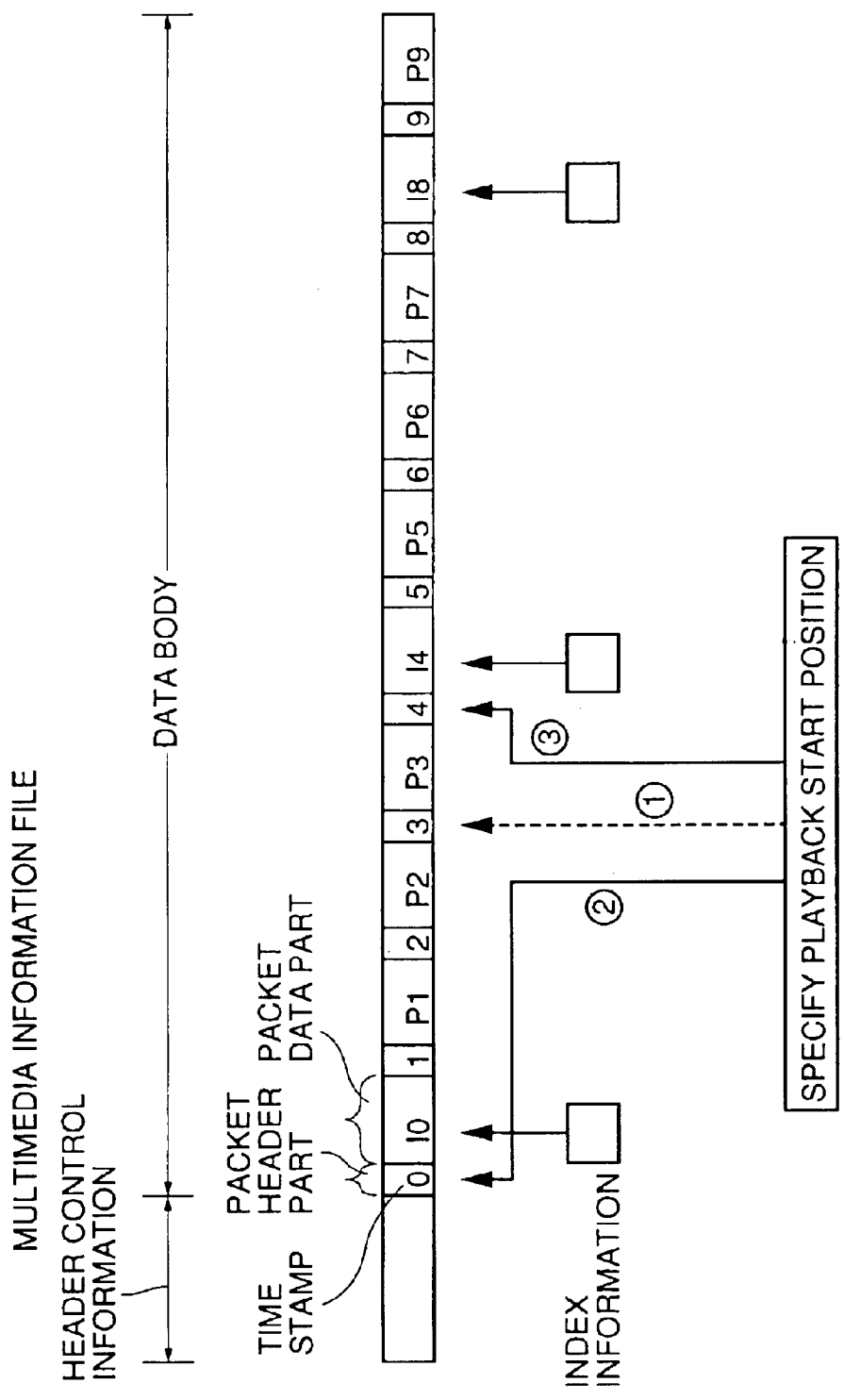
FIG. 5 is a diagram showing an exemplary multimedia information file of an edit object in the motion picture editing method and the motion picture editing apparatus according to one embodiment of the present invention.

In this case, only a random-accessible position (intra-frame coded frame) indicated by the index information is tacitly specified, as shown in FIG. 5. In processing of extracting an edit object position according to edit information described later, further, a playback start position can be decided with index information already present for implementing random access or the like.

The indirect referee is not restricted to the index information but another information may be employed so far as the information (marker information, for example) can specify the position of the data body. When the data body packet and the index information are managed with numbers, the numbers may be serial every medium.

At this time, a medium identify information element indicating information of a reference medium for expressing the playback start point and the playback end point is appended to the edit information. The information of the playback start point and the playback end point itself may indicate only the packet number of the medium specified by the medium identify information, or a narrative style (clarifying the combination of the medium and the number as Video-8 or Audio1-6, for example) capable of specifying the medium may be introduced into the information of the playback start point and the playback end point itself.

In the former method, the medium can be readily specified also when the structure of the medium is complicated (two motion pictures and four voices, for example). In the latter method, different media can be specified on the playback start point and the playback end point.

Particularly in the latter method, not only the position can be specified in more detail but also it is possible to prevent a feeling of misfit caused by the voice starting from/ending at an improper position when the playback start position and the playback end position are specified with the voice in place of a motion picture having a relatively long continuation time of a playback unit (one frame of the motion picture or the like).

Further, the aforementioned methods of specifying positions may be used together or intermixed so that the employed method can be properly selected or specified. In this case, a specification method identify information element indicating whether the method is specified with the storage position or the number is appended to the edit information for identifying the employed method, similarly to the aforementioned association of the medium and the number.

As to the playback start point and the playback end point, a method of describing information according to the specification method and a method of describing the information of the playback start point and the playback end point itself in a style capable of identifying the specification method (combining method identification and information of the specified destination as Offset.120 or Index.5, for example) can be employed.

Further, the data body of the multimedia information is managed with the playback time, and hence the edit information can include only information of the time. At this time, the edit information may include only information of the playback time without including direct or indirect reference to the data body. In this case, control for playback can be executed on the basis of only the time regardless of the contents or the format of the data body, and hence the processing can be advantageously simplified.

However, the data body is not referred to (a proper time can be freely specified), and hence the specified playback start position and playback end position may be inconsistent with the time stamps of the data body. Therefore, it is necessary to provide a rule for interpreting the contents (the playback start position and the playback end position) of the edit information as the time stamps (immediately approximate, immediately before, immediately after or the like, for example) of the data body.

When only an intra-frame coded frame is employed as a random-accessible position, the infra-frame coded frame must be regarded as the playback start position.

While this can be automatically implemented when the data body is indirectly referred to from the index information as hereinabove described, otherwise it is necessary to provide a rule for interpreting the playback start position as an intra-frame coded frame immediately before, immediately after or immediately approximate to the data body.

When the unit of packeting is a single frame and the data body of the multimedia information file is formed by intra-frame coded frames (I0, I4 and I8) and inter-frame coded frames (P1, P2, P3, P5, P6, P7 and P9) as shown in FIG. 5 and the inter-frame coded frame P3 is specified as the playback start position (broken-line arrow ① in FIG. 5), for example, the intra-frame coded frame I0 immediately before the data body (solid-line arrow ② in FIG. 5) or the intra-frame coded frame I4 immediately after or immediate approximate to the data body (solid-line arrow ③ in FIG. 5) is pointed in practice.

When an external different file is specified as the playback object file ID, unique information such as a file ID included in header control information may be employed for the file storing the multimedia information or information such as a file name assigned to each file for management on the recording medium may be employed.

Further, a rule may be provided for a method of naming the file itself such as an extension in the aforementioned file name, for clarifying the association between the edit information and the playback object file. When the name of the playback object file is foo.mpg, for example, the edit information is provided with a file name foo.edt.

A rule for regarding the file foo.mpg as the edit object of the file foo.edt when there is no file named foo.* (* is assumed to be an arbitrary extension) except the files foo.edt and foo.mpg is so provided that the file name of the referee may not be explicitly specified in the edit information but the association of the file is clarified without decoding the contents of the file.

The files may be specified with a simple file name, a file name including a relative/absolute pass name including a directory etc. in the file structure of the recording medium, a file name including a relative pass or an absolute pass from a user name in a multi-user system and the directory of the specified user, a pass name including the name of an apparatus connected on a network+a file name, a pass name including information related to an access destination such as a URL and an access method or the like+a file name, and any of these file names can be employed independently or in combination.

Thus, the files can be flexibly and freely specified regardless of the positions thereof, due to a technique similar to a method of specifying files in a general file system.

When only a part is extracted from the source multimedia information with the edit information, the contents of the header control information must be changed with respect to the extracted data. For example, it may be necessary to change time management information (time stamp) indicating the time for playing each packet of the data body.

This is because only a part of the data body originally arranged in order of playback times is extracted, and particularly when the playback start point indicates an intermediate position of the data body, the initial value of the playback start time must be correctly changed.

When the initial value of the playback start time must be a predetermined value (time 0, for example) for playing the multimedia information, this is introduced into the edit information as playback time management information since the difference (offset) between the time specified by the playback start point and the initial value must be obtained for adjusting the playback start time.

In this case, the playback time management information must be held for the respective ones of N extracted parts. A plurality of parts are inconsistently extracted from temporally continuous arrangement of the data body and concatenated with each other, and hence the playback time is adjusted on each part for guaranteeing consistency of the playback time.

The position for storing the aforementioned edit information is located on a part other than the data body, in order to leave the data body of the source multimedia information as such without manipulation. For example, the edit information may be included in the header control information arranged at the head of the file or the header control information arranged at the end of the file (at the back of the data body), or may be stored as a file different from the file storing the data body.

When these means are used together, a file position identify information element indicating whether the specified designations of the playback start point and the playback end point are in the same file or an external different file is appended to the edit information, or the edit information is enabled to indicate a file describing the information of the playback start point and the playback end point or the external file.

Figure 6:
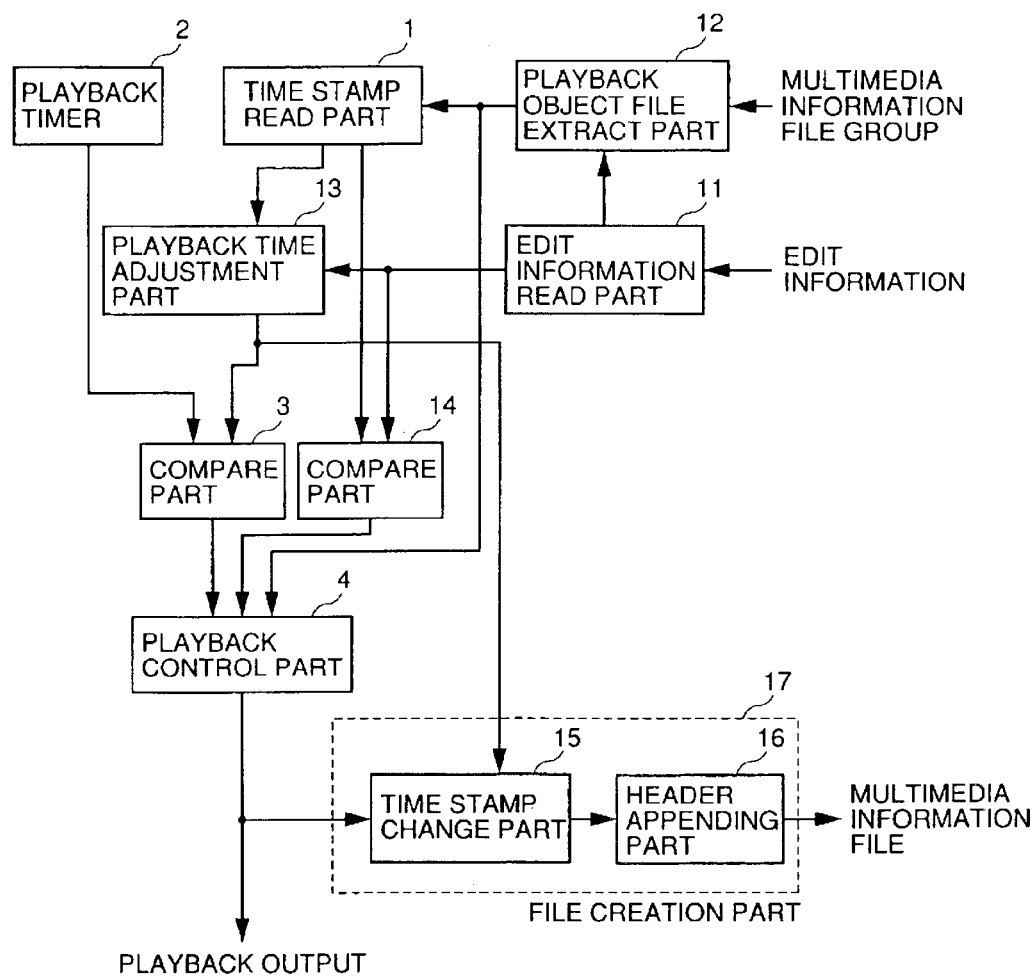
FIG. 6 is a functional block diagram showing a schematic structure of the motion picture editing apparatus according to one embodiment of the present invention.

A schematic structure of the editing apparatus according to this embodiment is now described with reference to FIG. 6. Referring to FIG. 6, the editing apparatus according to this embodiment includes an edit information read part 11 reading the aforementioned edit information, a playback object file extract part 12 extracting the multimedia information file of the playback object from a multimedia information file group stored on the recording medium (not shown) on the basis of the playback object file ID read in the edit information read part 11 and sending the multimedia information file to a time stamp read part 1, and a playback time adjustment part 13 comparing the playback start position read in the edit information read part 11 with the time stamp read in the time stamp read part 1 for carrying out a prescribed operation on the value of the aforementioned time stamp following the playback time management information read in the edit information read part 11 when the time stamp exceeds the playback start position thereby calculating a specified playback time and outputting the specified playback time to the compare part 3. The editing apparatus further includes a compare part 14 comparing the time stamp read in the time stamp read part 1 with the playback end position read in the edit information read part 11 and outputting a result of comparison to a playback control part 4. The editing apparatus further includes a time stamp change part 15 changing the value of the time stamp in the multimedia information data played and output from the playback control part 4 to the specified playback time calculated in the playback time adjustment part 13 and a header appending part 16 appending header control information to the multimedia information data having the time stamp changed in the time stamp change part 15. The time stamp change part 15 and the header appending part 16 form a file creation part 17.

Figure 7:
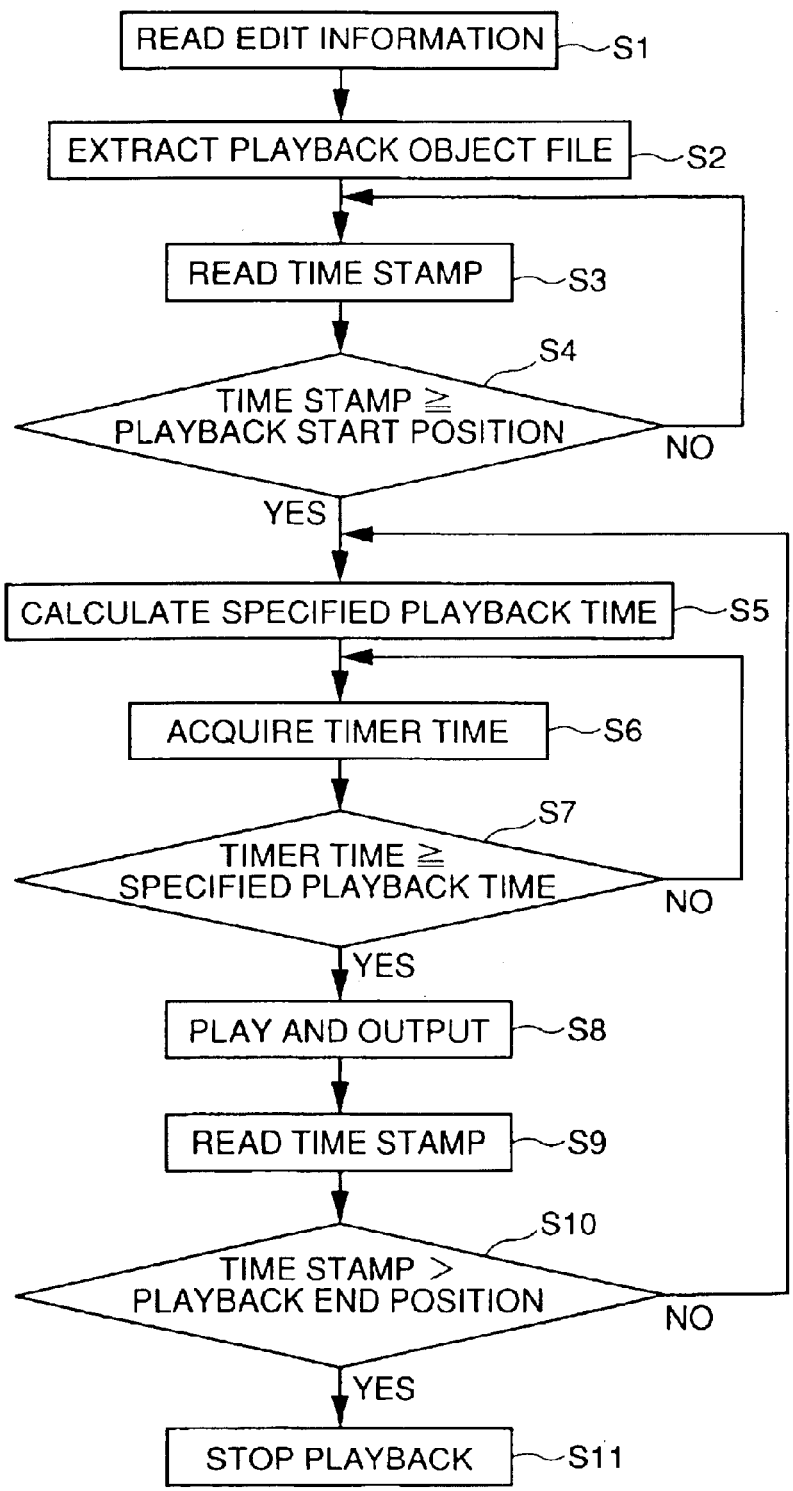
FIG. 7 is a flow chart showing the motion picture editing method according to one embodiment of the present invention.

The procedure of playback output in the editing apparatus formed in the aforementioned manner is described with reference to a flow chart of FIG. 7. First, the edit information read part 11 reads the edit information (step 1), the playback object file extract part 12 acquires the multimedia information data of the playback object file corresponding to the read playback object file ID (step 2), and the time stamp read part 1 reads the time stamp included in the acquired multimedia information data (step 3).

The time stamp read in the time stamp read part 1 is compared with the playback start position read in the edit information read part 11 (step 4), and when the time stamp reaches the playback start position, the prescribed operation is carried out on the value of the time stamp for calculating the specified playback time (step 5) while the current timer time (playback reference time) of a playback timer 2 is acquired (step 6) on the basis of the playback time management information read in the edit information read part 11. When the time stamp is smaller than the playback start position, the process returns to the step 3 and repeats the aforementioned operation.

The compare part 3 compares the specified playback time obtained in the playback time adjustment part 13 with the timer time counted by the playback timer 2 (step 7), and when the timer time is identical to or larger than the specified playback time, the playback control part 4 plays and outputs another multimedia information (step 8) When the timer time is smaller than the specified playback time, the process returns to the step 6 and repeats the aforementioned operation.

Further, next multimedia information data is acquired and a time stamp included therein is read (step 9). The compare part 14 compares this time stamp with the playback end position read in the edit information read part 11 (step 10), and when the time stamp is larger than the playback end position, the playback control part 4 stops the playback output (step 11). When the time stamp is identical to or smaller than the playback end position, the process returns to the step 5 and repeats the aforementioned operation.

Figure 8:
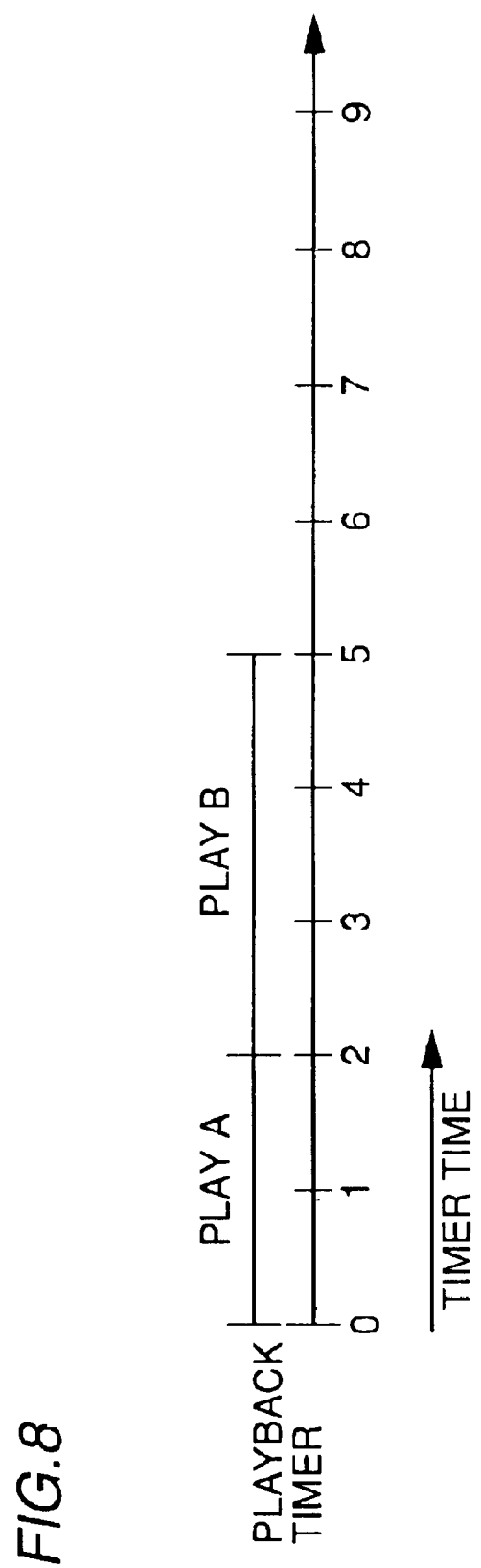
FIG. 8 is a diagram showing exemplary playback output in the motion picture editing method and the motion picture editing apparatus according to one embodiment of the present invention.
Figure 23:
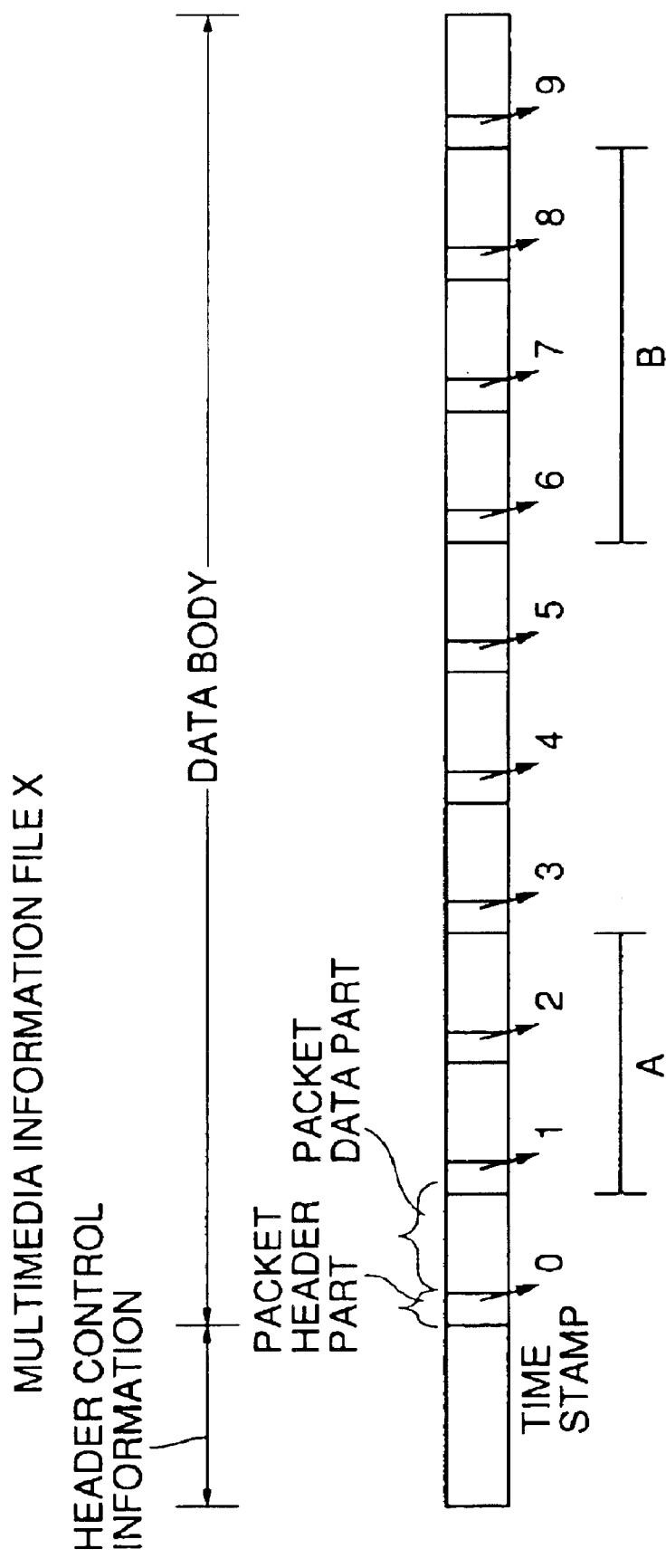
FIG. 23 is a diagram showing a schematic structure of a multimedia information file.
Figure 24:
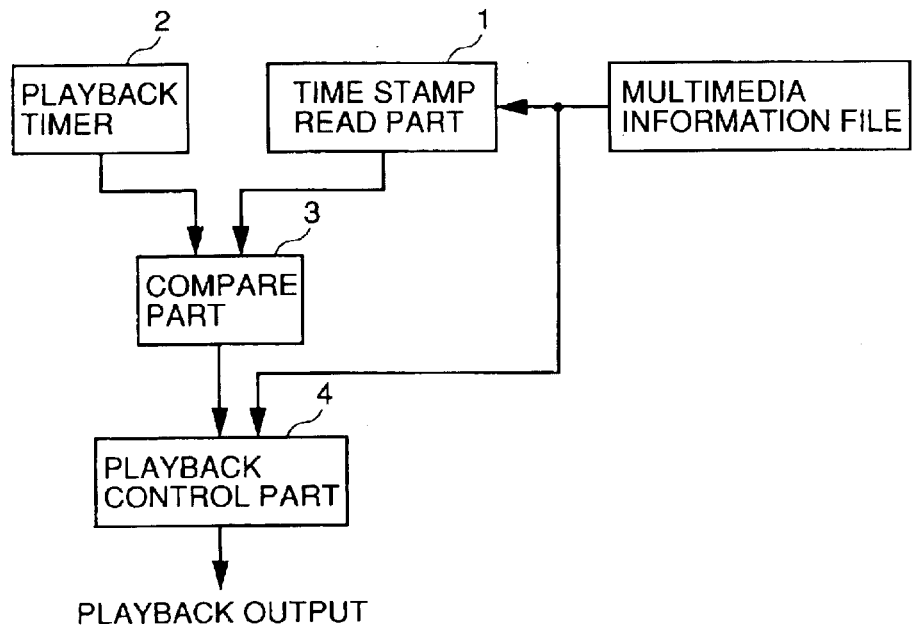
FIG. 24 is a block diagram showing a schematic structure of a conventional playback apparatus for multimedia information.
Figure 25:
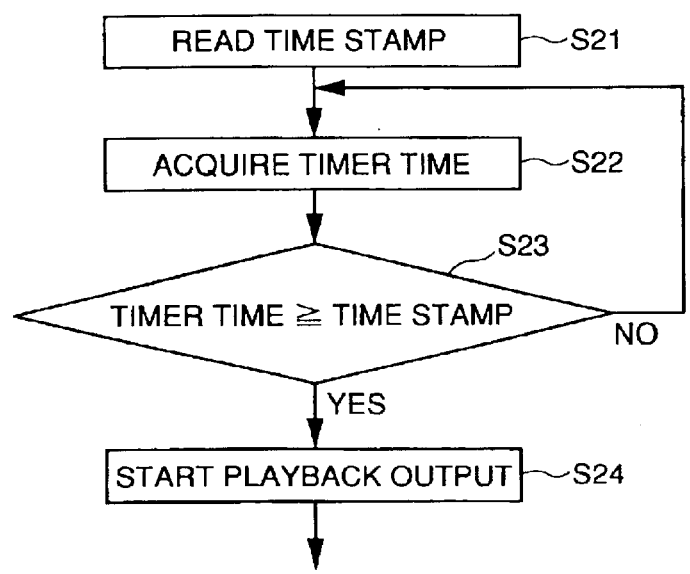
FIG. 25 is a flow chart showing a conventional playback method for multimedia information.
Figure 26:
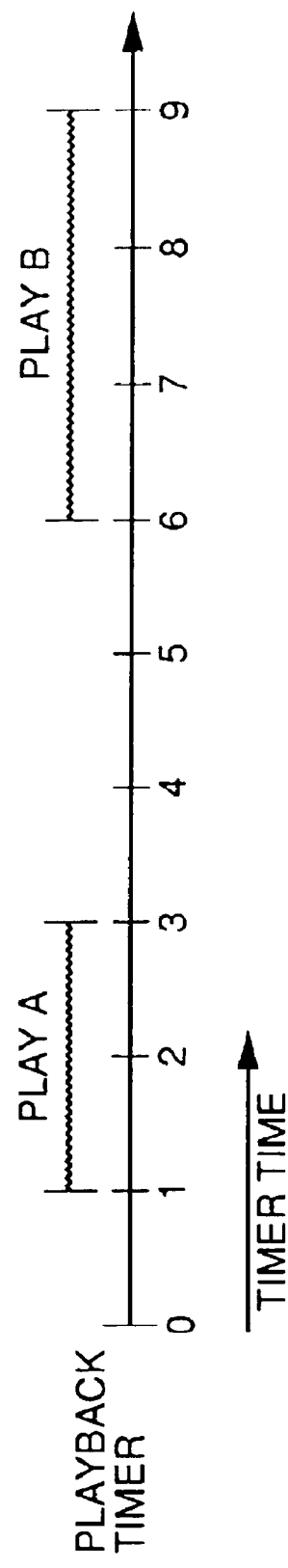
FIG. 26 is a diagram showing a case where only arbitrarily extracted partial data is played by the conventional playback apparatus for multimedia information.

Operation of extracting and connecting the part A (time stamps 1 to 2) and the part B (time stamps 6 to 8) from the multimedia information file X shown in FIG. 23 and playing the same at timing shown in FIG. 8 is specifically described. In this case, edit information shown in FIG. 9, for example, is previously set.

The part A is played on the basis of the first playback start position described as the time stamp 1. The playback time management information is described as offset 1, and hence the playback time adjustment part 13 subtracts the offset from the time stamp read in the time stamp read part 1 to obtain the specified playback time, and compares the obtained specified playback time with the timer time of the playback timer 2.

Therefore, the specified playback time for the packet having the time stamp 1 is 1−1=0, and the part A is started to be played and output when the timer time is 0. Similarly, the specified playback time for the packet having the time stamp 2 is 2−1=1, and this part is played and output when the timer time is 1.

When a packet having a time stamp larger than 2 is received, the compare part 14 detects this since the playback end position is described as the time stamp 2, and the playback control part 4 terminates playing and outputting this part.

In addition, the part B is played on the basis of the second playback start position described as the time stamp 6 in the edit information. The playback time management information is described as offset 4, and hence the playback time adjustment part 13 subtracts the offset from the time stamp to obtain the specified playback time, and compares the obtained specified playback time with the timer time of the playback timer 2.

Therefore, the specified playback time for the packet having the time stamp 6 is 6−4=2, and the part B is started to be played and output when the timer time is 2. Similarly, the specified playback time for the packet having the time stamp 8 is 8−4=4, and this part is played and output when the timer time is 4.

When a packet having a time stamp larger than 8 is received, the playback control part 4 terminates playing and outputting this part since the playback end position is described as the time stamp 8.

While no packet having a time stamp larger than that indicated by the playback end position is received when the multimedia information data ends, the playback output is of course ended when there is no input data itself.

While the playback start position and the playback end position are employed for describing the specified playback range in the above exemplary edit information, the present invention is not restricted to this but a playback duration can be employed in place of the playback end position as shown in FIG. 10, for example. In this case, the playback end position may be calculated from the playback start position and the playback duration and input in the compare part 14.

Further, the timer time itself can be described as the playback time management information, in place of the offset. In this case, the playback time adjustment part 13 may simply replace the value of the time stamp with the playback time management information (timer time).

According to this embodiment, as hereinabove described, the playback time management information is specified as the edit information along with the specified playback range so that the playback time for the specified playback range with respect to the timer time (playback reference time) can be arbitrarily adjusted on the basis of the playback time management information without changing the data body, and arbitrary parts can be readily extracted and continuously output from the multimedia information file.

Further, operation creating a new multimedia information file from the source multimedia information file and edit information as an edit result is described with reference to FIGS. 11A to 11C. When the part A (time stamps 1 to 2) and the part B (time stamps 6 to 8) are extracted from the multimedia information file X and simply connected into a single new file, the part A and the part B cannot be continuously played due to the time stamps similarly to the aforementioned prior art, as described above.

According to this embodiment, therefore, the time stamp change part 15 reaffixes time stamps to the edit result with the playback time management information included in the edit information and the header appending part 16 thereafter appends header control information, for creating a single new multimedia information file.

Figure 11A:
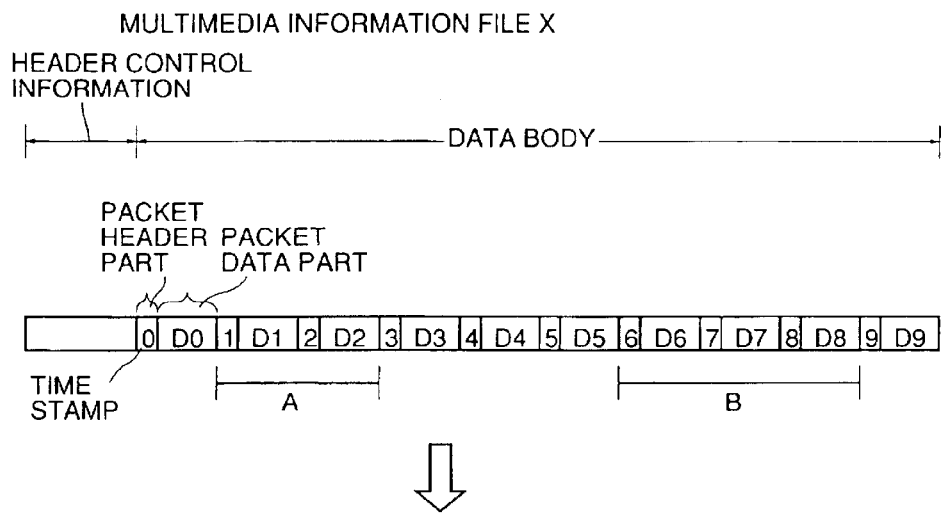
FIG. 11A to FIG. 11C are diagrams showing an exemplary new multimedia information file created from playback output.
Figure 11B:
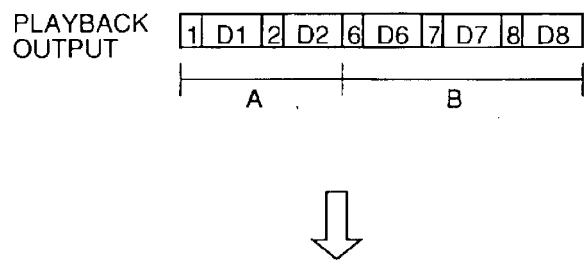
Figure 11C:
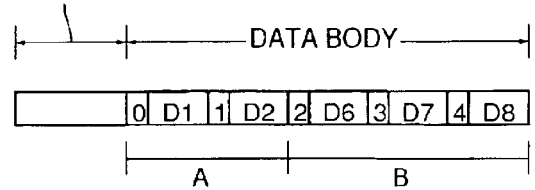

As shown in FIG. 11A, the playback time management information for the part A is the offset 1, and hence those obtained by subtracting 1 from the source time stamps are appended as new time stamps. Similarly, the playback time management information for the part B is the offset 4, and hence those obtained by subtracting 4 from the source time stamps are appended as new time stamps.

As described above, the part A and the part B can be continuously played and output as shown in FIG. 8 in a new multimedia information file Y (FIG. 11C) created by reaffixing the time stamps obtained from the playback time management information included in the edit information to the part A and the part B extracted and connected from the multimedia information file X, as understood from the values of the time stamps.

The multimedia information file is generally managed with reference to a management unit of a certain determined length, and hence dummy data may be appended in addition to a motion picture and a voice/audio as shown in FIGS. 12A to 12D also in the new multimedia information file Y (FIG. 11C), in order to match multimedia information data of an arbitrary length with integral times the prescribed management unit.

Figure 12A:
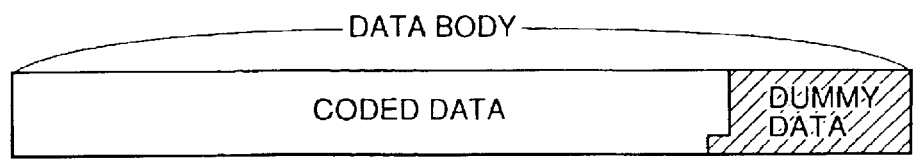
FIG. 12A to FIG. 12D are diagrams showing exemplary new multimedia information files created from playback output, to which dummy data are appended.

If dummy data is appended when medium data such as video data or audio data is coded, the data body is formed by directly embedding the dummy data in the generated coded data itself as shown in FIG. 12A.

Figure 12B:
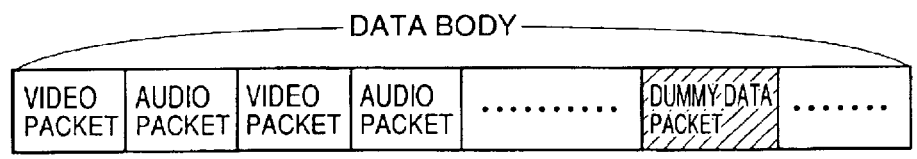

If dummy data is appended when medium data such as video data or audio data is packeted and multiplexed, a packet (dummy data packet) formed by dummy data is multiplexed and appended similarly to other packets including the medium data, as shown in FIG. 12B. In this case, the dummy data packet itself has information related to the packet length, and the dummy data packet is skipped on the basis of this information.

Figure 12C:
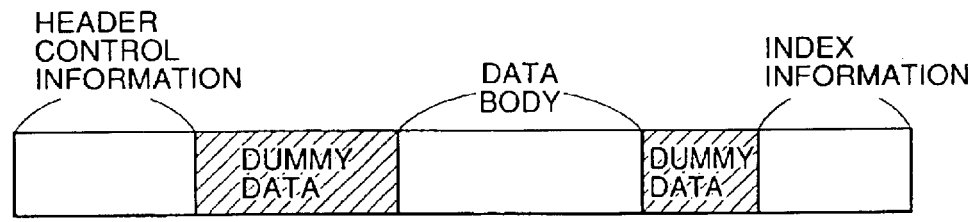
Figure 12D:
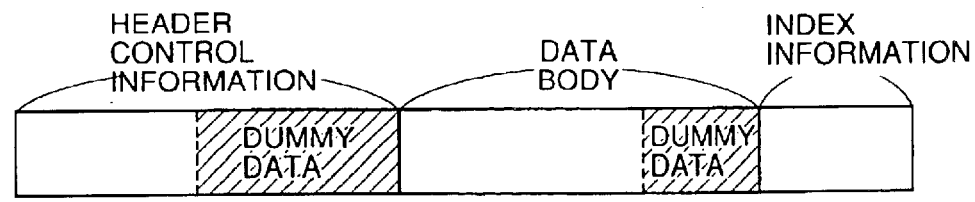

If dummy data is appended when the file is created, further, only index information is extracted from header control information and arranged at the back of the data body, as shown in FIG. 12C and FIG. 12D. This is because the index information is unnecessary for streaming playback and hence playback can be quickly started when streaming playback is performed, due to this arrangement.

FIG. 12C shows a case of stuffing a clearance between header control information and a data body or between the data body and index information with dummy data. In this case, a series of "0" invalid as the head of the data body or the index information, for example, may be stuffed in the inserted dummy data to be sought until the next head is detected in the dummy data part, or the size of the dummy data area may be explicitly indicated on the head portion of the dummy data area so that the dummy data area is skipped.

FIG. 12D shows a case of appending and stuffing dummy data to the tail end positions in the respective ones of header control information and a data body. In this case, both of the actual size of the header control information or the data body including the dummy data and the effective size of the header control information or the data body not including the dummy data may be recorded in an area other than the dummy data area to be utilized for skipping the dummy data, or the dummy data area itself may have size information as described above with reference to FIG. 12C.

In the editing apparatus according to the aforementioned first embodiment, the playback object file extract part 12 extracts the desired multimedia information file on the basis of the playback object file. ID read in the edit information read part 11 and outputs the multimedia information file to the time stamp read part 1. Alternatively, the playback object file extract part 12 may extract only the playback range of the desired multimedia information file in response to the playback object file ID, the playback start position and the playback end position read in the edit information read part 11 and output the playback range to the time stamp read part 1.

(2) Second Embodiment

A second embodiment of the motion picture editing method and the motion picture editing apparatus according to the present invention is now described with reference to FIG. 13 to FIG. 18C as to operation of connecting and playing a plurality of multimedia information files. The same reference numerals are assigned to parts identical to those in the first embodiment, and redundant description is not repeated.

Figure 13:
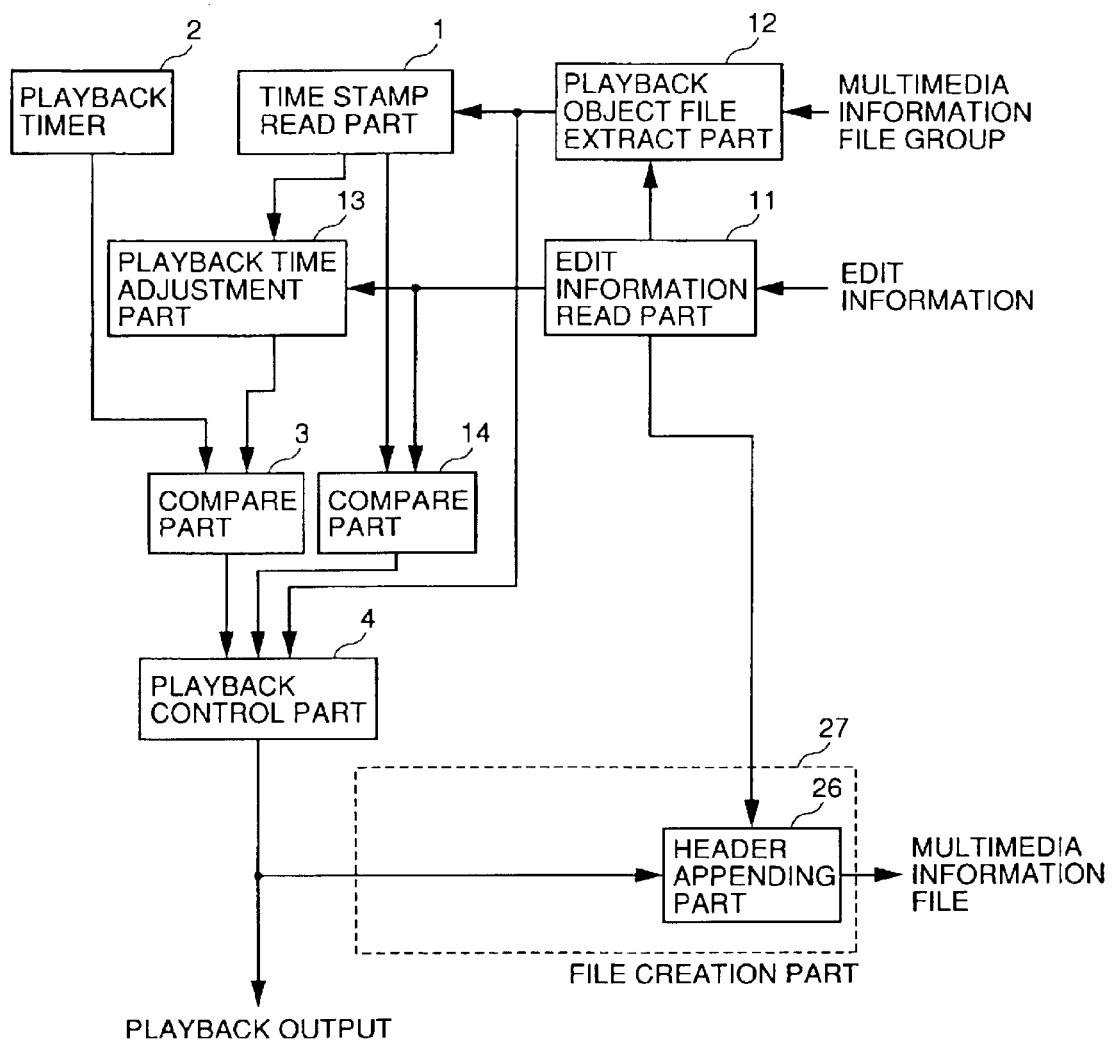
FIG. 13 is a functional block diagram showing a schematic structure of a motion picture editing apparatus according to a second embodiment of the present invention.

Referring to FIG. 13, the editing apparatus according to the second embodiment is different from the editing apparatus according to the aforementioned first embodiment in a point that a header appending part 26 is provided as a file creation part 27 for appending header control information including new edit information obtained on the basis of the contents of edit information read in an edit information read part 11 to multimedia information data played and output from a playback control part 4.

Figures 14A, 14B:
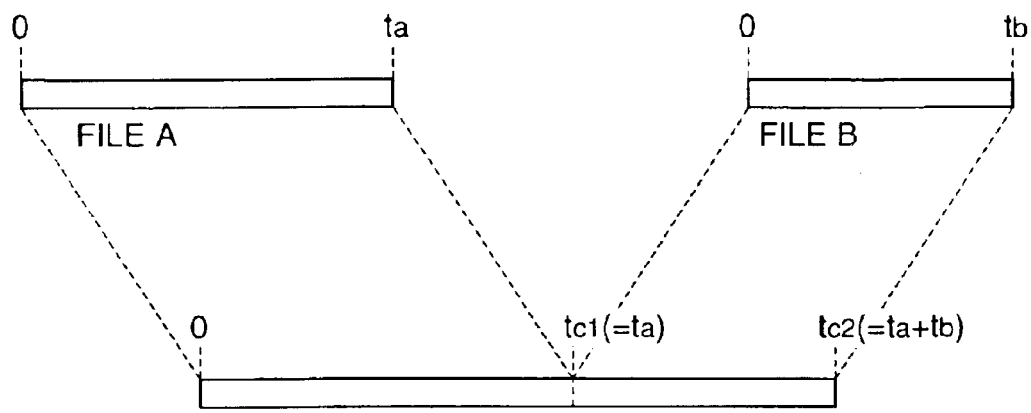
FIG. 14A and FIG. 14B are diagrams showing playback output and exemplary edit information therefor in the second embodiment.

According to this embodiment, two multimedia information files A and B are connected and played as shown in FIG. 14A and FIG. 14B, while source data bodies themselves are not manipulated, similarly to the aforementioned first embodiment. In current edit information a, a playback start position, a playback end position and playback time management information are described for each playback object file, as shown in FIG. 14B.

The playback start position and the playback end position can be specified with time information (a time stamp and a playback time), a physical storage position, a packet number or the like, as described above. An offset value is employed as the playback time management information.

The file A may be played and output along the time stamp, and hence the offset value of the playback time management information is 0. Further, the overall data of the file A is pointed as the playback range by setting the playback object file ID to A, the playback start position to 0 and the playback end position to ta.

In order to start playing the file B at a time tc1 (=ta), a playback time management information offset value is set to −ta. Further, the overall data of the file B is pointed as the playback range by setting the playback object file ID to B, the playback start position to 0 and the playback end position to tb.

When the data are played according to this edit information $\alpha$, the data of the file A can be played between timer times 0 and tc1 and the data of the file B can be played and output between timer times tc1 and tc2 (=ta +tb).

According to this embodiment, as hereinabove described, a plurality of multimedia information files can be readily connected, played and output without changing data bodies by specifying respective specified playback ranges and playback time management information for the playback ranges for the plurality of playback object files as edit information.

In the edit information a shown in FIG. 14B, the playback objects point the overall data bodies from first to last. Thus, when the overall data bodies in the playback object files are the playback objects, description of the playback start positions, the playback end positions or durations may be omitted in the edit information a, as shown in FIG. 15A.

When the playback ranges are not explicitly indicated in the edit information $\alpha$, the overall data bodies in the playback object files are interpreted as the playback objects. In this case, the edit information read part 11 shown in FIG. 13 supplements and outputs the omitted information of the playback ranges.

Further, the first playback time management information can be omitted as shown in FIG. 15B, only when the same is the first element in the edit information and the playback time management information is 0. In this case, the edit information read part 11 shown in FIG. 13 supplements and outputs the omitted playback time management information. Further, the edit element number may be omitted when the number of edit elements may not be explicitly indicated.

Operation of creating a new multimedia information file from source multimedia information files and edit information as an edit result is described with reference to FIGS. 16A and 16B.

Figures 16A, 16B:
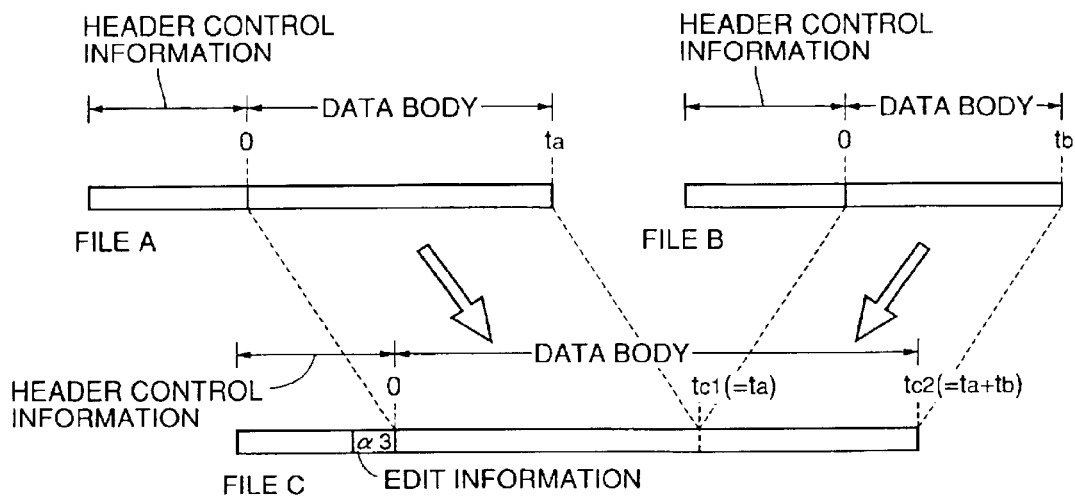
FIG. 16A and FIG. 16B are diagrams showing a new multimedia information file created from playback output and exemplary edit information included in the multimedia information file in the second embodiment.

When a file A and a file B are connected for creating a new single file C to which header control information is appended as shown in FIGS. 16A and 16B, time stamps of a part copied from the file A may remain as such in the file C, while those obtained by adding ta to the source time stamps must be reaffixed as to time stamps of a part copied from the file B.

According to this embodiment, therefore, the header appending part 26 creates edit information $\alpha 3$ specifying offset −ta as playback time management information for the part copied from the file B and stores the edit information $\alpha 3$ in header control information of the new file C, thereby adding ta to the time stamps of this part in playback and implementing a function similar to that reaffixing the time stamps.

Thus, the edit information is stored as part of the header control information of the new multimedia information file and the head and the tail of the data body (data body extracted from the source multimedia information files) of the new multimedia information file are pointed as a playback start position and a playback end position respectively while information corresponding to a playback time of the data body head is set as playback time management information.

In other words, the edit information stored as the header control information of the new multimedia information file specifies the difference (offset) between the time to start playback and the playback time (time stamp value) of the data body head as the playback time management information.

Thus, when a new file is created from part of the data body of a certain file, time stamp values may not be rewritten over the entire data body for matching the playback time of the data body head with the time to start playback but the data body including a large quantity of information may be simply copied or rearranged in the file, whereby the processing can be extremely simplified.

When the edit information is included in the multimedia information files as the edit information α3 shown in FIG. 16B and the multimedia information files including the edit information are to be played, description of the playback object file IDs may be omitted within the edit information α3, as shown in FIG. 17.

When the playback object file IDs are not explicitly indicated in the edit information α3, the multimedia information files including the edit information α3 are interpreted as the playback object files. In this case, the edit information read part 11 shown in FIG. 13 supplements and outputs the omitted playback object file IDs.

(3) Third Embodiment

A third embodiment of the motion picture editing method and the motion picture editing apparatus according to the present invention is described with reference to FIG. 18A to FIG. 20 as to operation of dividing a single multimedia information file into a plurality of files and playing the files. The same reference numerals are assigned to parts identical to those in the aforementioned second embodiment, and redundant description is not repeated.

According to the third embodiment, a file A is divided into two multimedia information data and played as shown in FIG. 18A, while the source data body itself is not manipulated similarly to the first embodiment.

Edit information a corresponding to the first half part (time stamps 0 to ta1) after division and edit information β corresponding to the second half part (time stamps ta1 to ta2) after division are set, while playback start positions, playback end positions and playback time management information of the respective ones are described, as shown in FIG. 18B and FIG. 18C. Offset values are employed as the playback time management information.

The time stamps of the part (the first half part after division) extracted by the edit information a start from 0, and hence the playback time management information in the edit information a may be the offset value 0. When playback is performed according to this edit information a, therefore, data of the first half part after division can be played and output between timer times 0 and tb (=ta1).

On the other hand, the time stamps of the part (the second half part after division) extracted by the edit information β start from ta1, and hence the playback time management information in the edit information β is set to the offset value ta1. When playback is performed according to this edit information β, therefore, data of the second half part after division can be played and output between timer times 0 and tc (=ta2−ta1).

According to this embodiment, as hereinabove described, a single multimedia information file can be divided so that any divided data can be played and output from the time 0 without changing the data body, by setting multiple edit information corresponding to data parts after division.

Operation of creating new multimedia information files from a source a multimedia information file and edit information as an edit result is described with reference to FIG. 19.

Also in this case, new edit information including playback time management information describing the difference (offset) between a playback start time initial value and a playback time (time stamp 1) of a data body head may be stored in the new multimedia information files after division, similarly to the aforementioned second embodiment.

Figure 19:
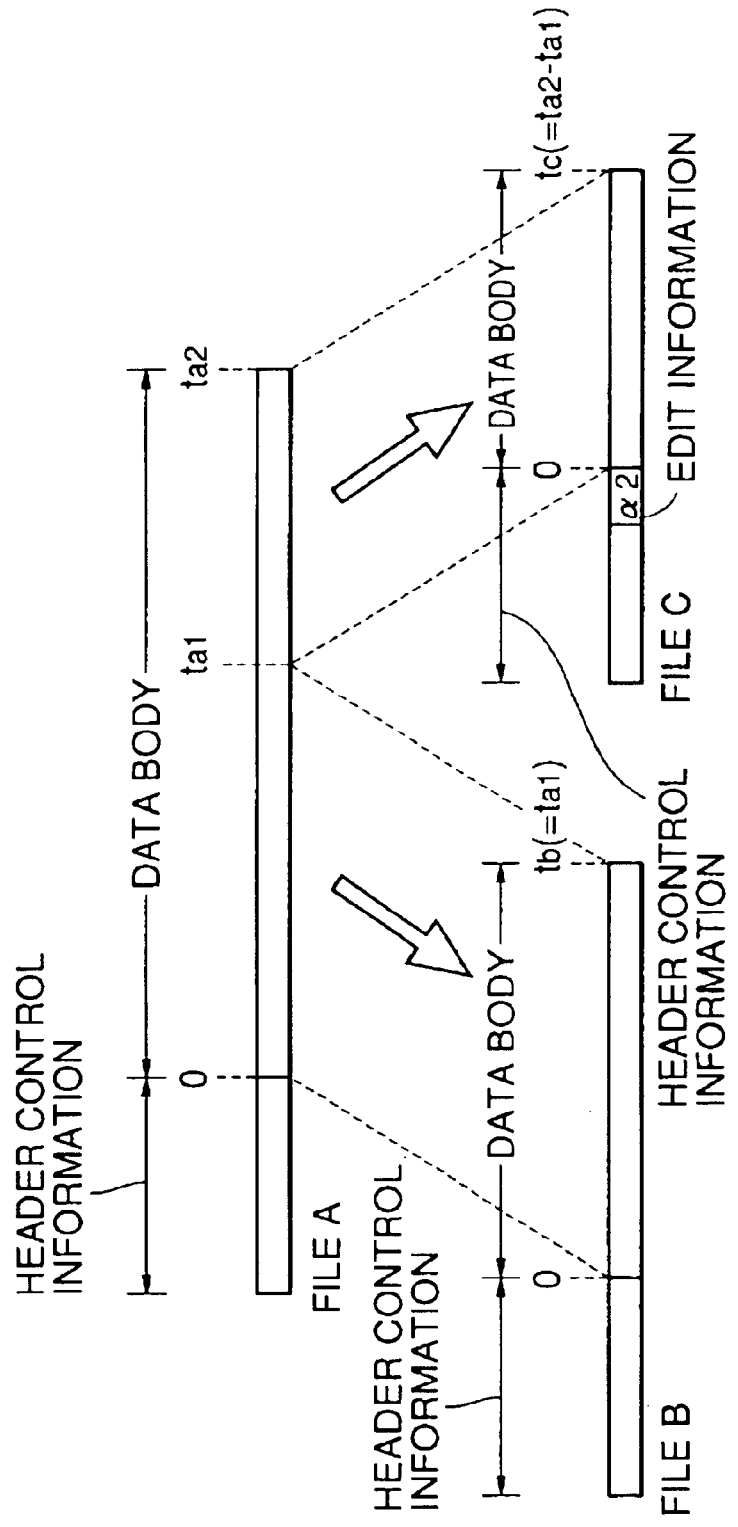
FIG. 19 is a diagram showing exemplary new multimedia information files created from playback output in the third embodiment.

When a file A is divided for creating a file B and a file C, for example, time stamps in the file B may not be reaffixed but time stamps in the file C must be reaffixed, as shown in FIG. 19.

Therefore, edit information α2 is introduced into header control information of the file C, thereby adjusting the values of the time stamps on the basis of playback time management information included in the edit information α2 when the file C is played and implementing a function similar to that reaffixing the time stamps.

When the edit information is included in the multimedia information file as the edit information α2 shown in FIG. 19 and the overall data body is to be played from first to last, description of both of a playback object file ID and a playback range may be omitted within edit information α, as shown in FIG. 20.

When the playback object file ID and the playback range are not explicitly indicated in the edit information α2, the overall data body in the multimedia information file including the edit information α2 is interpreted as the playback object. In this case, the edit information read part 11 shown in FIG. 13 supplements and outputs the omitted playback object file ID and playback range.

(4) Fourth Embodiment

A fourth embodiment of the motion picture editing method and the motion picture editing apparatus according to the present invention is described with reference to FIG. 21 as to operation of extracting, connecting and playing single parts of a plurality of multimedia information files. The same reference numerals are assigned to parts identical to those in the aforementioned first to third embodiments, and redundant description is not repeated.

According to this embodiment, single parts are further extracted and connected from an edit result extracted and connected from α file A and a file B by edit information a and an edit result extracted and connected from a file C by edit information β to be played and output as shown in FIG. 21, while source data bodies themselves are not manipulated similarly to the aforementioned first embodiment.

As shown in FIG. 21, the edit information a describes information for connecting data obtained by extracting parts of time stamps ta1 to t2 from the file A with data obtained by extracting parts of time stamps tb1 to tb2 from the file B. The edit information P describes information for extracting parts of time stamps tc1 to tc2 from the file C. It is assumed that the edit information a and the edit information β already exist as files different from the source multimedia information files A, B and C.

Further, when data obtained by extracting a part (time stamps td1 to td2) of the edit result defined according to the edit information α is connected with data obtained by extracting a part (time stamps te1 to te2) of the edit result defined according to the edit information β, the edit information a and the edit information β can be specified as playback object files in the current edit information.

In other words, complicated edit contents can be simply described by setting playback object file IDs to α and β in edit information γ1 while setting playback start positions, playback end positions and playback time management information of the respective files to td1, td2, td1, te1, te2 and te1−te2+td1 with times on the edit results formed by the edit information a and the edit information β.

The edit information ax refers to the source files A and B while the edit information β refers to the source file C, and hence contents similar to those of the aforementioned edit information γ1 can be described as edit information γ2 with reference to the files A, B and C. This edit information γ2 specifies the source files A, B and C as the playback object files, and the playback start positions, the playback end positions and the playback time management information are responsively described as follows:

The playback range is described as time stamps ta3 (=td1+ta1) to ta2 and the playback time management information is described as offset td1+ta1 in the file A, the playback range is described as tb1 to tb3 (td2+tb1−ta2+ta1) and the playback time management information is described as offset tb1−ta2+td1+ta1 in the file B, and the playback range is described as tc3 (=te1+tc1) to tc4 (=te2+tc1) and the playback time management information is described as offset te1+tc1−td2+td1 in the file C.

Thus, also when a certain edit result is further edited, the edit information α and the edit information β are not referred to as the playback objects as in the edit information γ1 but the source multimedia information files A, B and C are referred to as in the edit information γ2, so that the result edited with the edit information γ2 is not influenced even if the edit information α and the edit information β are erased later.

While the playback object file ID cannot indicate whether the edit information is pointed or the data body is pointed as the playback object when the edit information is embedded and stored in the source multimedia information file, the playback start position or the playback end position may be described as Edit-10 or Video-8, for example, in a format capable of specifying whether the playback object is the edit information or a medium included in the data body in this case.

According to this embodiment, as hereinabove described, a plurality of multimedia information files can be extremely simply subjected to complicated editing to be played and output without changing data bodies, by specifying existing edit information as the playback object files of edit information.

(5) Fifth Embodiment

A fifth embodiment of the motion picture editing method and the motion picture editing apparatus according to the present invention is described with reference to FIGS. 22A to 22G as to operation of connecting and playing a plurality of multimedia information files including edit information in the files. The same reference numerals are assigned to parts identical to those in the aforementioned first to fourth embodiments, and redundant description is not repeated.

According to this embodiment, a file A and a file B are connected, played and output with edit information β, as shown in FIGS. 22A to 22C. Source data bodies themselves are not manipulated, similarly to the first embodiment. Time stamps start from tb1 and end at tb2 in the file B, and this file includes edit information a describing the time stamp tb1 as playback time management information.

When the presence of the edit information α is not taken into consideration, edit information β may be described as shown in FIG. 22D. The edit information β can be described with no edit information α in the file B by providing such a rule that the edit information β present as a file different from the files A and B to be edited is preferential to the edit information a in the file B.

When the presence of the edit information α in the file B is utilized to the contrary, the edit information β can be described as shown in FIG. 22E. While finally edited playback time management information is to be tb1−ta as shown in FIG. 22D, the edit information α already describes tb1 as the playback time management information and hence the edit information β may describe only −ta. The information tb1−ta is obtained by summating tb1 and −ta.

In this case, management of the playback time of the file B can be left to the edit information α, and hence the time stamps of the file B may not be observed but only the edit information α may be observed when the edit information β is generated. In the edit information β shown in FIG. 22E, playback start positions, playback end positions etc. which can be omitted are omitted as described in relation to the first embodiment with reference to FIG. 15.

Further, the edit information α already present in the file B may be rewritten in this case. In other words, the playback time management information tb1−ta for the file B, described in the edit information β in FIG. 22D, is described in the edit information α as shown in FIG. 22G. Further, no playback time management information is described but only the playback object file ID is described in the edit information β, as shown in FIG. 22F. Thus, the processing can be simplified when a new multimedia information file is created as an edit result.

INDUSTRIAL APPLICABILITY

In the motion picture editing method and the motion picture editing apparatus according to the present invention, as hereinabove described, a desired playback range is selected from motion picture data recorded on a recording medium and playback information of the playback range is extracted along with playback time information so that edit information for playing the extracted range is appended to the recording medium on the basis of the extracted playback information and playback time information, whereby a desired motion picture can be edited with the edit information without changing the source playback information.

What is claimed is:

1. A motion picture editing method editing motion picture data played and output from a motion picture file stored on a recording medium and having a motion picture data body which includes a plurality of packets arranged in temporal order, each of said packets having time management information and motion picture data corresponding to said time management information in temporal order, said method comprising steps of:

previously specifying at least one playback range in the motion picture file and a playback time of said playback range;

appending information for managing the specified playback range and the playback time of the playback range to an area other than said motion picture data body on said recording medium as edit information;

adjusting the playback start time for each said playback range based on said time management information and said edit information;

outputting motion picture data of the specified range in said motion picture file at said specified time on the basis of said time management information and said edit information.

2. The motion picture editing method according to claim 1, further comprising a step of changing the time management information in said output motion picture data on the basis of said edit information and creating a new motion picture file.

3. The motion picture editing method according to claim 1, further comprising a step of appending edit information including information for managing the playback time for said output motion picture data to an area other than the motion picture data body on said recording medium and creating a new motion picture file.

4. A motion picture editing method as set forth in claim 1 further comprising
defining an edit result in said motion picture file on the basis of said time management information and said edit information;
further specifying at least one playback range in said edit result and a playback time of said playback range;
appending information for managing the specified playback range and the playback time of the playback range to an area other than said motion picture data body on said recording medium as second edit information; and
outputting motion picture data of the specified range in said motion picture file at the specified time on the basis of time management information in said edit result and said second edit information.

5. A motion picture editing apparatus editing motion picture data played and output from a motion picture file stored on a recording medium and having a motion picture data body which includes a plurality of packets arranged in temporal order, each of said packets having time management information and motion picture data corresponding to said time management information:
means specifying a desired playback range and a playback time of said playback range;
means extracting specific information of said specified playback range and said playback time information;
means creating edit information on the basis of said extracted specific information and playback time information and recording said edit information in an area other than said motion picture data body on said recording medium;
means for adjusting the playback start time for each said playback range based on said time management information and said edit information; and
playback means playing said playback range at said specific time on the basis of said edit information.

6. The motion picture editing apparatus according to claim 5, wherein
said specify means specifies a plurality of said playback ranges, and
said playback means continuously plays said plurality of playback ranges.

7. The motion picture editing apparatus according to claims 5 or 6, wherein said playback means includes:
edit information read means reading information for managing at least one playback range in the motion picture file and a playback time of said playback range,
playback object file extract means extracting a prescribed motion picture file on the basis of the information for managing the playback range read in said edit information read means,
time management information read means reading time management information in motion picture data included in the motion picture file extracted in said playback object file extract means,
playback time adjustment means carrying out a prescribed operation on the time management information read in said time management information read means and calculating a specified playback time on the basis of the information for managing the playback time read in said edit information read means,
compare means comparing the specified playback time calculated in said playback time adjustment means with a time counted by a playback timer, and
control means outputting motion picture data of the specified range in said motion picture file on the basis of a result of comparison in said compare means.

8. The motion picture editing apparatus according to claim 7, further comprising time management information change means changing the time management information in the motion picture data output from said control means to the playback time calculated in said playback time adjustment means.

9. The motion picture editing apparatus according to claim 7, further comprising edit information appending means appending edit information including information for managing the playback time for the motion picture data output from said control means to an area other than the motion picture data body on said recording medium.

10. The motion picture editing apparatus according to claim 9, wherein a new motion picture file including said motion picture data and the edit information appended to said motion picture data is created.

11. A motion picture playback apparatus playing a motion picture file stored on a recording medium and having a motion picture data body formed by arranging time management information and motion picture data corresponding to said time management information in temporal order, comprising:
edit information read means reading edit information appended to an area other than said motion picture data body on said recording medium and including information for managing a playback time of said motion picture data;
time management information read means reading time management information in said motion picture data;
playback time adjustment means carrying out a prescribed operation on the time management information read in said time management information read means and calculating a specified playback time on the basis of the information for managing the playback time read in said edit information read means;
compare means comparing the specified playback time calculated in said playback time adjustment means with a time counted by a playback timer; and
control means outputting motion picture data in said motion picture file at the specified time on the basis of a result of comparison in said compare means.

12. The motion picture playback apparatus according to claim 11, wherein
said edit information includes information for managing at least one playback range in said motion picture file and a playback time of said playback range.

13. The motion picture playback apparatus according to claim 11 or 12, further comprising time management information change means changing the time management information in the motion picture data output from said control means to the playback time calculated in said playback time adjustment means.

14. The motion picture playback apparatus according to claim 11 or 12, farther comprising edit information appending means appending edit information including the playback time for the motion picture data output from said control means to an area other than the motion picture data body on said recording medium.

15. The motion picture playback apparatus according to claim 14, wherein a new motion picture file including said motion picture data and the edit information appended to said motion picture data is created.

* * * * *

UNITED STATES PATENT AND TRADEMARK OFFICE
CERTIFICATE OF CORRECTION

PATENT NO. : 6,819,394 B1
DATED : November 16, 2004
INVENTOR(S) : Toshio Nomura et al.

It is certified that error appears in the above-identified patent and that said Letters Patent is hereby corrected as shown below:

Title page,
Item [54], Title, "TIME-VARYING IMAGE EDITING METHOD AND TIME-VARYING IMAGE EDITING DEVICE" should read as the following: -- MOTION PICTURE EDITING METHOD, MOTION PICTURE EDITING APPARATUS AND MOTION PICTURE PLAYBACK APPARATUS --.
Item [73], Assignee, "Sharp Kabushiki Kaisha, Tokyo (JP)" should read as the following: -- Sharp Kabushiki Kaisha, Osaka (JP) --.

Signed and Sealed this

Twenty-third Day of August, 2005

JON W. DUDAS
*Director of the United States Patent and Trademark Office*